(12) United States Patent
Kondo et al.

(10) Patent No.: US 7,551,230 B2
(45) Date of Patent: Jun. 23, 2009

(54) DEVICE AND METHOD FOR PRODUCING COEFFICIENT SEED DATA USED FOR FORMAT CONVERSION, AND INFORMATION-PROVIDING MEDIUM THEREFORE

(75) Inventors: Tetsujiro Kondo, Tokyo (JP); Yasushi Tatehira, Kanagawa (JP); Takuo Morimura, Kanagawa (JP); Nobuyuki Asakura, Tokyo (JP); Wataru Niitsuma, Tokyo (JP); Kei Hiraizumi, Kanagawa (JP); Takahide Ayata, Kanagawa (JP)

(73) Assignee: Sony Corporation, Tokyo (JP)

( * ) Notice: Subject to any disclaimer, the term of this patent is extended or adjusted under 35 U.S.C. 154(b) by 877 days.

(21) Appl. No.: 11/197,187

(22) Filed: Aug. 4, 2005

(65) Prior Publication Data
US 2005/0270416 A1 Dec. 8, 2005

Related U.S. Application Data

(63) Continuation of application No. 10/204,591, filed as application No. PCT/JP01/11453 on Dec. 26, 2001, now Pat. No. 7,038,729.

(30) Foreign Application Priority Data
Dec. 26, 2000 (JP) .............................. 2000-395873

(51) Int. Cl.
*H04N 7/01* (2006.01)
(52) U.S. Cl. ........................ 348/581; 348/441; 348/458; 382/299

(58) Field of Classification Search ................. 348/581, 348/441, 458, 448; 345/660, 667; 382/299–301, 382/260, 261; 708/442, 445, 109, 313
See application file for complete search history.

(56) References Cited

U.S. PATENT DOCUMENTS
5,294,998 A 3/1994 Piovoso et al. ............... 382/261
(Continued)

FOREIGN PATENT DOCUMENTS
EP 0 975 156 1/2000
(Continued)

*Primary Examiner*—Victor R Kostak
(74) *Attorney, Agent, or Firm*—Frommer Lawrence & Haug LLP; William S. Frommer

(57) ABSTRACT

The present invention relates to an information signal processor and the like preferable for use in the case of converting a format of an image signal or converting an image size. An input image signal Vin (525i signal) is converted into an output image signal Vout (such as 1080i signal, XGA signal, or 525i signal for obtaining an image to be displayed in a different magnification). A class code CL is obtained from tap data selectively extracted from the Vin and corresponding to each pixel (pixel at a target position) within a unit pixel block, which constitutes Vout. A coefficient production circuit 136 produces coefficient data for each class, which is used at the time of calculating the pixel data at the target position, based on the coefficient seed data for each class and position information h, v about the target position generated in a position information generation circuit 139. A calculation circuit 127 provides pixel data y1 to yp of the target position according to the estimated equation using the tap data xi corresponding to the target position and the coefficient data Wi corresponding to the class code CL.

8 Claims, 16 Drawing Sheets

U.S. PATENT DOCUMENTS

| | | | | |
|---|---|---|---|---|
| 5,889,894 A * | 3/1999 | Ito et al. | ............ | 382/300 |
| 5,991,464 A * | 11/1999 | Hsu et al. | ............ | 382/300 |
| 6,233,019 B1 * | 5/2001 | Kondo et al. | ............ | 348/458 |
| 6,236,766 B1 * | 5/2001 | Zavaljevski et al. | ............ | 382/300 |
| 6,252,576 B1 | 6/2001 | Nottingham | ............ | 345/660 |
| 6,339,434 B1 | 1/2002 | West et al. | | |
| 6,466,702 B1 * | 10/2002 | Atkins et al. | ............ | 382/300 |
| 6,611,260 B1 | 8/2003 | Greenberg et al. | ............ | 345/204 |
| 6,714,688 B1 * | 3/2004 | Gallagher et al. | ............ | 382/266 |
| 7,233,364 B2 * | 6/2007 | Kondo et al. | ............ | 348/458 |
| 7,280,152 B2 * | 10/2007 | Kondo | ............ | 348/441 |
| 7,283,173 B2 * | 10/2007 | Kondo | ............ | 348/441 |

FOREIGN PATENT DOCUMENTS

| | | |
|---|---|---|
| EP | 1 001 353 | 5/2000 |
| EP | 1 335 596 | 8/2003 |
| JP | 5 504433 | 7/1993 |
| JP | 2000 41223 | 2/2000 |
| JP | 2000 207391 | 7/2000 |
| JP | 2000-244876 | 9/2000 |
| JP | 2001-195586 | 7/2001 |
| JP | 2002 218414 | 8/2002 |

* cited by examiner

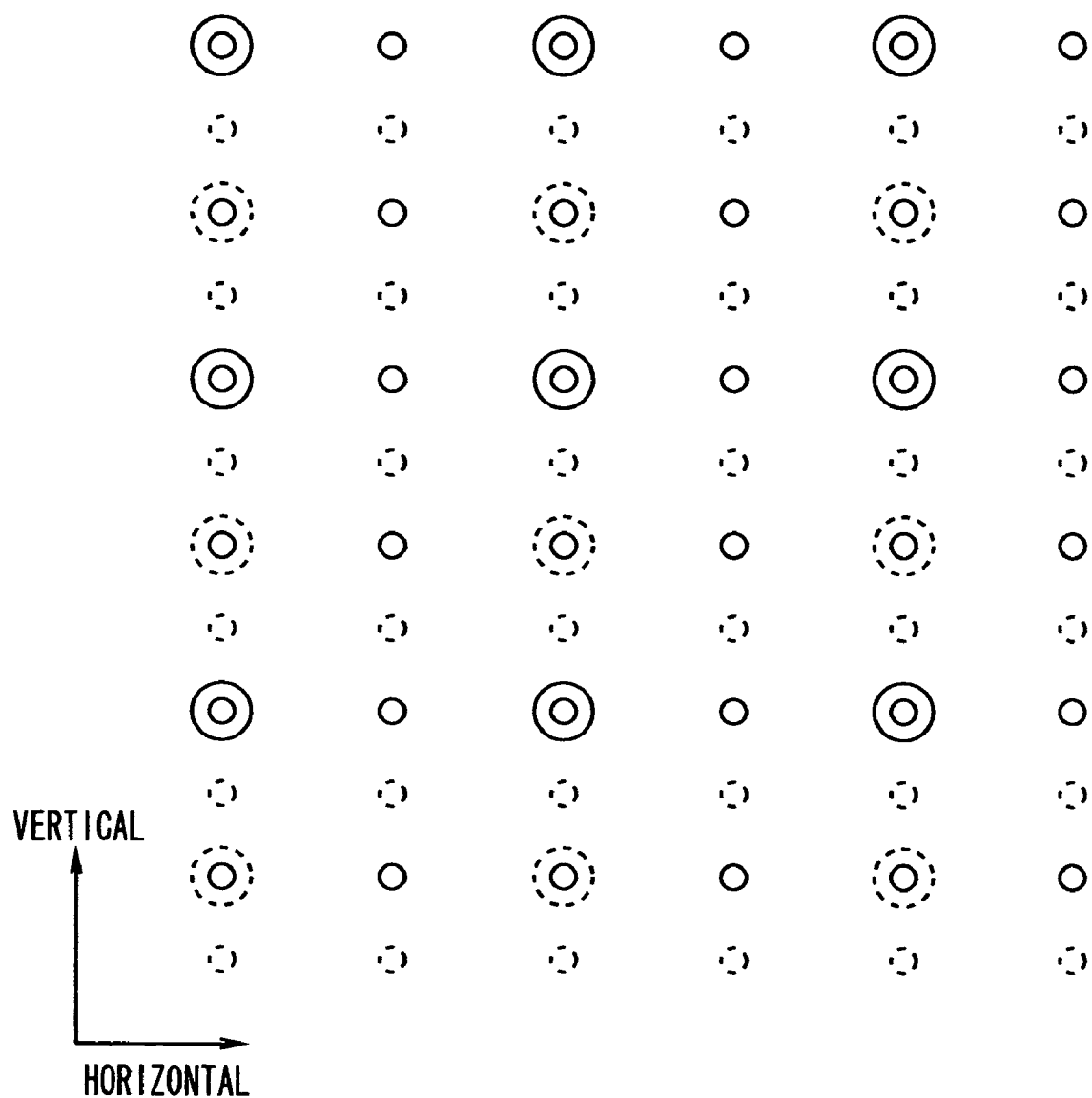

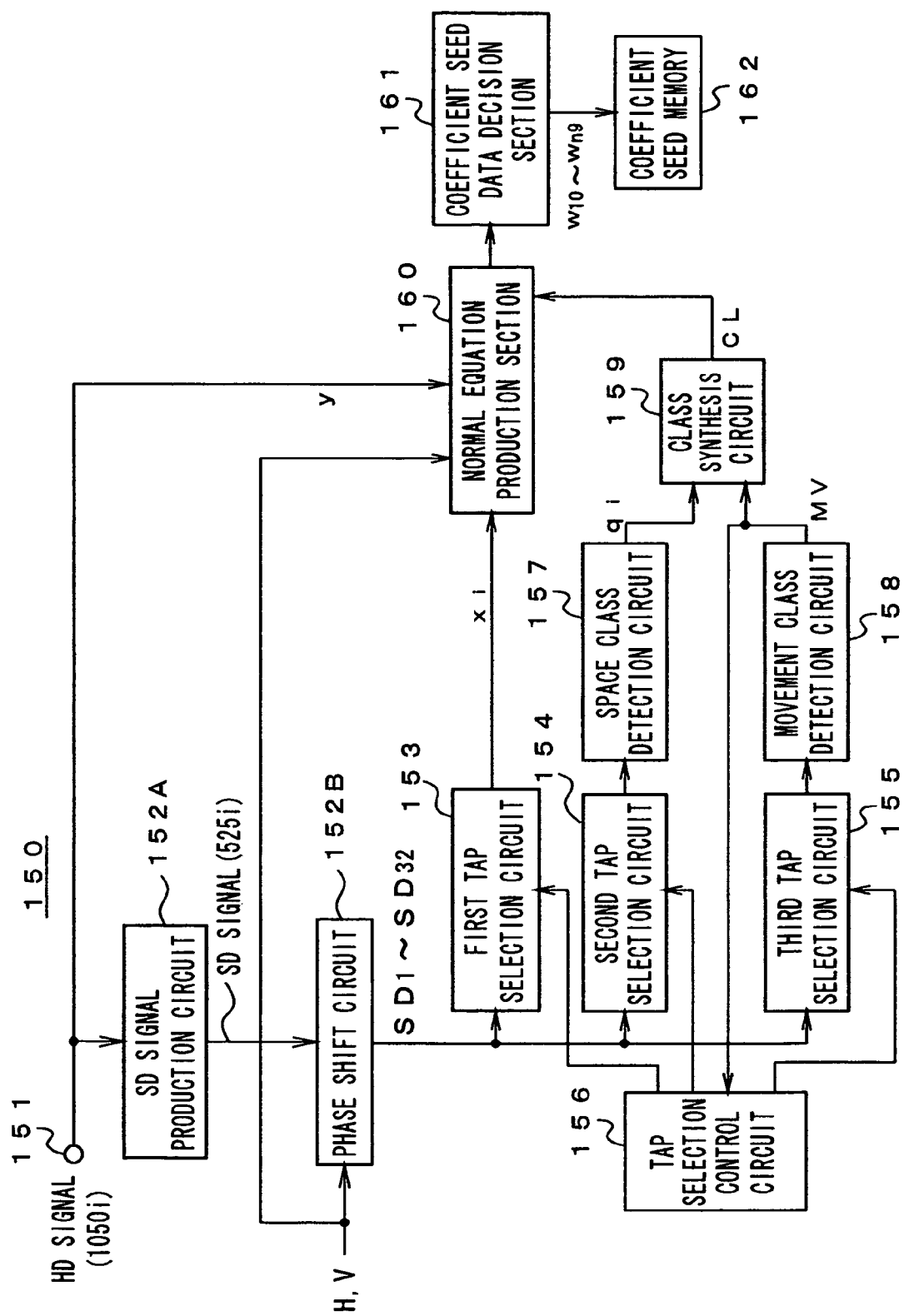

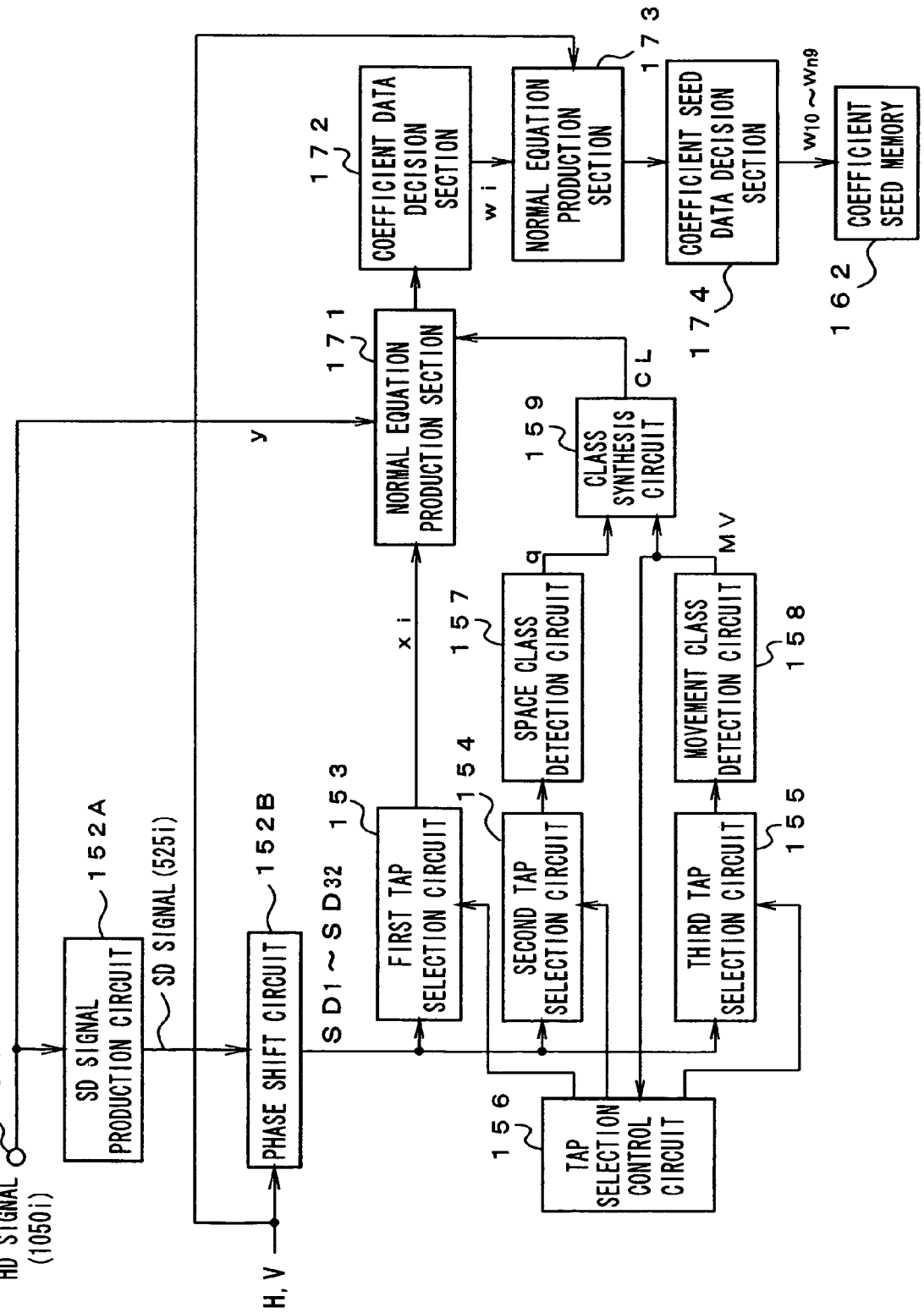

FIG. 18
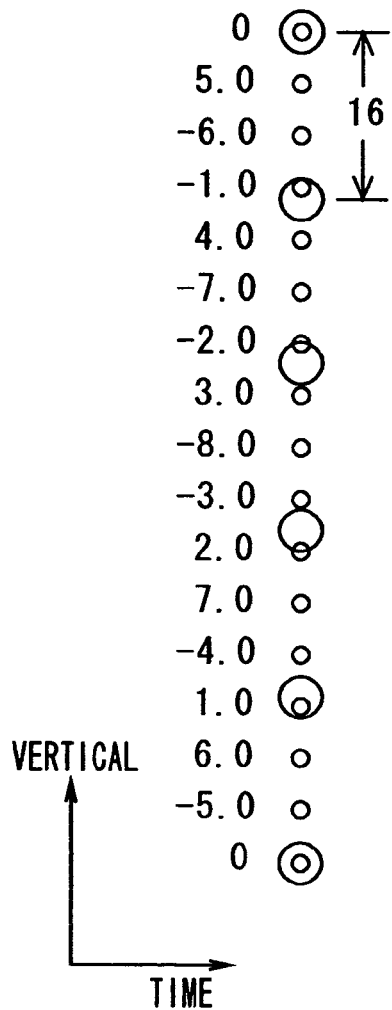
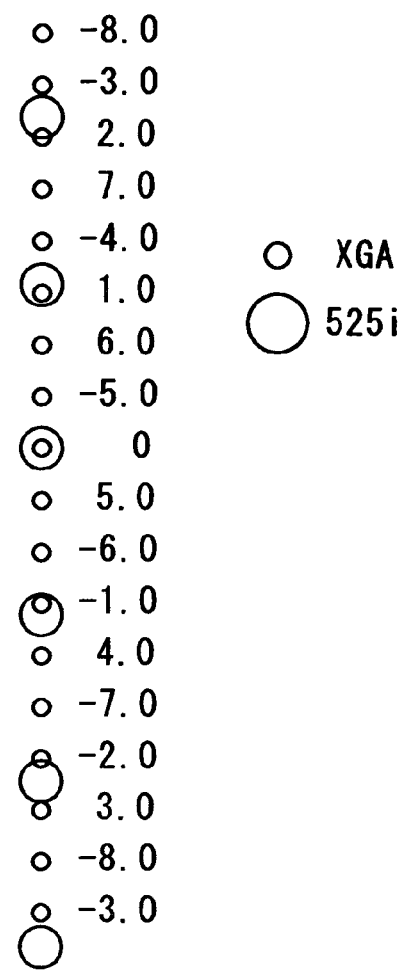
FIG. 19
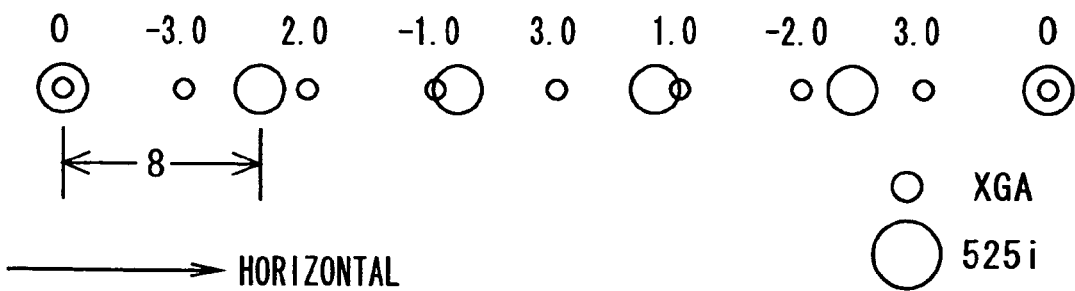

DEVICE AND METHOD FOR PRODUCING COEFFICIENT SEED DATA USED FOR FORMAT CONVERSION, AND INFORMATION-PROVIDING MEDIUM THEREFORE

This is a continuation of application Ser. No. 10/204,591, filed Aug. 22, 2002 now U.S. Pat. No. 7,038,729, the entirety of which is incorporated herein by reference, which is a 371 of PCT/JP01/11453, filed on Dec. 26, 2001, the entirety of which is incorporated herein by reference.

TECHNICAL FIELD

The present invention relates to an information signal processor, a method for processing an information signal, an image signal processor and an image display apparatus using the same, a device and a method for producing coefficient seed data used in the same, and an information-providing medium, which are preferable for use in the case of, for example, converting a format of an image signal or converting a size of an image.

More specifically, the present invention relates to an information signal processor and the like whereby, when converting a first information signal into a second information signal, position information about a target position in the second information signal is obtained from the information about format or size conversion, and based on the resultant position information, coefficient data of an estimated equation is produced from coefficient seed data, and information data of the target position in the second information signal is obtained using thus-produced coefficient data, thereby allowing a memory for storing a large amount of coefficient data at the time of making conversions into various formats and sizes to be eliminated.

BACKGROUND ART

In order to convert formats or image sizes, it is required to acquire pixel data having a position different from a position of pixel data of an input image signal so as to obtain an output image signal. In this case, the format or the image size thus converted makes a position relationship of the pixel of the output image signal to the pixel of the input image signal univocally determined.

As an example of a format conversion, description will be made as to a case where an input image signal is a 525i signal and an output image signal is a 1080i signal. The 525i signal means an image signal in an interlace system consisting of 525 lines. The 1080i signal means an image signal in an interlace system consisting of 1080 lines. FIG. 14 shows a positional relationship between the pixels of the 525i signal and the pixels of the 1080i signal. Herein, large dots are pixels of the 525i signal, and small dots are pixels of the 1080i signal. Solid lines express the positions of pixels in odd fields and broken lines express the positions of pixels in even fields.

When converting the 525i signal into the 1080i signal, it is required to obtain a pixel block in the unit of 9×9 of the 1080i signal in correspondence with each pixel block in the unit of 4×4 of the 525i signal in the respective odd and even fields.

FIG. 15 shows a position relationship in a vertical direction between the pixels of the 525i signal and the pixels of the 1080i signal. In FIG. 15, the numerical value assigned to each pixel of the 1080i signal means a shortest distance from the pixel of the 525i signal in a vertical direction. In this case, the interval between the pixels of the 525i signal in a vertical direction is set to 16. In this manner, each of the numerical values assigned to each pixel of the 1080i signal shows position information of this pixel in a vertical direction with respect to the pixel of the 525i signal.

The position information is set to a negative value when the pixel of the 1080i signal is located at a position upper than the pixel of the 5251 signal (i.e. a pixel located at the shortest distance from this pixel of the 1080i signal), while it is set to a positive value when the pixel of the 10801 signal is located at a position lower than the pixel of the 525i signal. The same thing is applied to the drawing showing a position relationship in a vertical direction between an extended graphics array (XGA) signal, which will be described later, and the 525i signal.

FIG. 16 shows a phase position relationship in a horizontal direction between the pixels of the 525i signal and the pixels of the 1080i signal. In FIG. 16, the numerical value assigned to each pixel of the 1080i signal means a shortest distance from the pixel of the 525i signal in a horizontal direction. In this case, the interval between the pixels of the 525i signal in a horizontal direction is set to 8. In this manner, each of the numerical values assigned to the pixel of the 1080i signal shows position information of this pixel in a horizontal direction with respect to the pixel of the 525i signal.

The position information is set to a negative value when the pixel of the 1080i signal is located at a position more left to the pixel of the 525i signal (i.e. a pixel located at the shortest distance from this pixel of the 1080i signal) while it is set to a positive value when the pixel of the 1080i signal is at a position more right to the pixel of the 525i signal. The same thing is applied to the drawing showing a position relationship in a horizontal direction between the XGA signal, which will be described later, and the 525i signal.

Next, as an example of a format conversion, description will be made as to a case where an input image signal is a 525i signal and an output image signal is an XGA signal. The XGA signal is an image signal in a progressive system (i.e. non-interlace system) available at a display with a resolution of 1024×768 dots. FIG. 17 shows a positional relationship between the pixels of the 525i signal and the pixels of the XGA signal. Herein, large dots are pixels of the 525i signal, and small dots are pixels of the XGA signal. In addition, as to the 525i signal, solid lines express the positions of pixels in odd fields and broken lines express the positions of pixels in even fields.

When converting the 525i signal into the XGA signal, it is required to obtain a 8×16 pixel block of the 1080i signal in correspondence with each 5×5 pixel block of the 525i signal in the respective odd and even fields.

FIG. 18 shows a position relationship in a vertical direction between the pixels of the 525i signal and the pixels of the XGA signal. In FIG. 18, each of the numerical values assigned to the pixels of the XGA signal means a shortest distance from the pixel of the 525i signal in a vertical direction. In this case, the interval between the pixels of the 525i signal in a vertical direction is set to 16. In this manner, each of the numerical values assigned to the pixels of the XGA signal shows position information of this pixel in a vertical direction with respect to the pixel of the 525i signal.

FIG. 19 shows a position relationship in a horizontal direction between the pixels of the 525i signal and the pixels of the XGA signal. In FIG. 19, each of the numerical values assigned to the pixels of the XGA signal means a shortest distance from the pixel of the 525i signal in a horizontal direction. In this case, the interval between the pixels of the 525i signal in a horizontal direction is set to 8. In this manner, each of the numerical values assigned to the pixels of the XGA signal shows position information of this pixel in a horizontal direction with respect to the pixel of the 525i signal.

Although an example of image size conversion is not specifically shown, the position relationship of the pixels of the output image signal to the pixels of the input image signal is uniquely determined, as is the case of the format conversion described above. For example, in the case where the size of an image (magnification of a displayed image) is magnified by 9/4 times in both vertical and horizontal directions, the same position relationship is obtained as the position relationship between the 525i signal and the 1 080i signal described above.

Conventionally, it has been suggested to employ the following method at the time when pixel data of an output image signal is to be obtained from pixel data of an input image signal in order to convert formats or image sizes. That is, coefficient data of an estimated equation corresponding to each position of the pixel of the output image signal with respect to the pixel of the input image signal is stored in a memory. Then, by use of thus-obtained coefficient data, pixel data of the output image signal is obtained by the estimated equation.

As described above, if the format or the image size is different between before and after the conversion, then the position relationship of the pixels of the output image signal to the pixels of the input image signal becomes different between before and after conversion accordingly. For this reason, in an apparatus in which a memory stores coefficient data of an estimated equation, when conversions into various formats or sizes are performed, it is required to store coefficient data into the memory in correspondence with each format or size. In such a case, it is required to install a memory capable of storing a large amount of coefficient data. This causes inconvenience that the conversion apparatus becomes expensive, and the like.

DISCLOSURE OF INVENTION

An objective of the present invention is to provide an information signal processor and the like which allows a memory for storing a large amount of coefficient data in order to make conversions into various formats or sizes to be eliminated.

An information signal processor in accordance with the present invention for converting a first information signal including a plurality of information data into a second information signal including a plurality of information data, comprises conversion information input means for inputting conversion information about a format or size conversion, information conversion means for converting the conversion information input by the conversion information input means into position information about a target position in the second information signal, first memory means for storing coefficient seed data, the coefficient seed data being coefficient data in production equation for producing coefficient data to be used in an estimated equation and said production equation using the position information as a parameter, coefficient data generation means for generating the coefficient data to be used in the estimated equation corresponding to the position information about the target position, the coefficient data in the estimated equation being produced according to the production equation using the coefficient seed data stored in the first memory means and the position information about the target position obtained as a result of conversion in the information conversion means, first data selection means for selecting a plurality of first information data located in periphery of the target position in the second information signal, based on the first information signal, and calculation means for calculating and obtaining information data of the target position based on the estimated equation using the coefficient data generated in the coefficient data generation means and the plurality of first information data selected in the first data selection means.

Further, a method for processing an information signal in accordance with the present invention for converting a first information signal including a plurality of information data into a second information signal including a plurality of information data comprises a first step of inputting conversion information about a format or size conversion, a second step of converting the conversion information input in the first step into position information about a target position in the second image signal, a third step of generating coefficient data to be used in estimated equation corresponding to the position information about the target position obtained as a result of the conversion in the second step according to production equation for producing coefficient data to be used in the estimated equation using coefficient seed data and the position information about the target position, the production equation using the position information as a parameter, and the coefficient seed data being coefficient data in the production equation, a fourth step of selecting a plurality of first information data located in periphery of the target position in the second information signal based on the first information signal, and a fifth step of calculating and obtaining information data of the target position based on the estimated equation using the coefficient data generated in the third step and the plurality of first information data selected in the fourth step.

Further, an information-providing medium in accordance with the present invention provides a computer program for executing each step in the method for processing the information signal described above.

Further, an image signal processor in accordance with the present invention for converting a first image signal including a plurality of pixel data into a second image signal including a plurality of pixel data, comprises conversion information input means for inputting conversion information about a format or size conversion, information conversion means for converting the conversion information input by the conversion information input means into position information about a target position in the second image signal, memory means for storing coefficient seed data, the coefficient seed data being coefficient data in production equation for producing coefficient data to be used in estimated equation, the production equation using the position information as a parameter, coefficient data generation means for generating the coefficient data to be used in the estimated equation corresponding to the position information about the target position, the coefficient data in the estimated equation being produced according to the production equation using the coefficient seed data stored in the memory means and the position information about the target position obtained as a result of conversion in the information conversion means, data selection means for selecting a plurality of pixel data located in periphery of the target position in the second image signal, based on the first image signal, and calculation means for calculating and obtaining pixel data of the target position based on the estimated equation using the coefficient data generated in the coefficient data generation means and the plurality of pixel data selected in the data selection means.

Further, an image display apparatus according to the present invention comprises image signal input means for inputting a first image signal including a plurality of pixel data, image signal processing means for converting the first image signal input from the image signal input means into a second image signal including a plurality of pixel data and for outputting the resultant second image signal, image display means for displaying an image produced by the second image signal received from the image signal processing means onto an image display element, and conversion information input means for inputting conversion information corresponding to a format or a size of the image displayed on the image display element. The image signal processing means includes information conversion means for converting the conversion information input by the conversion information input means into position information about a target position in the second image signal, first memory means for storing coefficient seed data, the coefficient seed data being coefficient data in production equation for producing coefficient data to be used in estimated equation, and the production equation using the position information as a parameter, coefficient data generation means for generating coefficient data to be used in the estimated equation corresponding to the position information about the target position, the coefficient data in the estimated equation being produced according to the production equation using the coefficient seed data stored in the first memory means and the position information about the target position obtained as a result of conversion in the information conversion means, first data selection means for selecting a plurality of first pixel data located in periphery of the target position in the second image signal, based on the first image signal, and calculation means for calculating and obtaining pixel data of the target position based on the estimated equation using the coefficient data generated in the coefficient data generation means and the plurality of first pixel data selected in the first data selection means.

According to the present invention, the conversion information about the format or size conversion is input and this conversion information is converted into the position information about the target position in the second information signal. Herein, the information signal is a signal such as an image signal and a sound signal. When the information signal is the image signal, the format or the image size after the conversion makes the position relationship of the pixels of the output image signal to the pixels of the input image signal uniquely determined. In addition, the plurality of first information data located in periphery of the target position in the second information signal is selected according to the first information signal.

Then, the information data of the target position is obtained corresponding to the position information about the target position in the second information signal. Specifically, the memory means stores the coefficient seed data, which is coefficient data in the production equation for producing the coefficient data to be used in the estimated equation. By use of this coefficient seed data and the position information about the target position in the second information signal, coefficient data in the estimated equation corresponding to the position information about this target position is generated. Then, by use of thus-generated coefficient data and the plurality of the first information data, information data of the target position is produced based on the estimated equation.

According to the invention described above, when the first information signal is to be converted into the second information signal, the position information about the target position in the second information signal is obtained from the conversion information about the format or size conversion, the coefficient data in the estimated equation is produced from the coefficient seed data based on thus-obtained position information, and the information data of the target position in the second information signal is obtained using the coefficient data. Therefore, the memory stores no coefficient data corresponding to various formats and sizes so that there is no need of a memory for storing a large amount of coefficient data on the conversions into various formats or sizes are performed.

When a sum of the coefficient data of the estimated equation produced using the coefficient seed data is obtained and then the information data of the target position produced using the estimated equation as described above is normalized with it being divided by the sum, it becomes possible to remove the fluctuations in the levels from the information data of the target position caused by a rounding error which occurs at the time when the coefficient data of the estimated equation is obtained by the production equation using the coefficient seed data.

Further, a coefficient seed data production device in accordance with the present invention for producing coefficient seed data, the coefficient seed data being coefficient data in a production equation for producing coefficient data to be used in estimated equation employed when converting a first information signal including a plurality of information data into a second information signal including a plurality of information data, the production equation using position information as a parameter, comprises signal processing means for performing a thinning-out processing on a teacher signal to obtain a student signal, position shift means for shifting a position of the student signal with a position of information data position of the teacher signal being gradually changed with respect to the information data position of the student signal, first data selection means for selecting a plurality of first information data located in periphery of a target position in the teacher signal, based on the student signal having a position shifted by the position shift means, normal equation production means for producing a normal equation for obtaining the coefficient seed data using the plurality of the first information data selected by the first data selection means and the information data at the target position in the teacher signal, and coefficient seed data calculation means for solving the normal equation to obtain the coefficient seed data.

Further, a method for producing coefficient seed data in accordance with the present invention for producing coefficient seed data used for producing coefficient data to be used in an estimated equation employed when converting a first information signal including a plurality of information data into a second information signal including a plurality of information data, the coefficient seed data being coefficient data in a production equation using position information as a parameter, comprises a first step of performing a thinning-out processing on a teacher signal to obtain a student signal, a second step of shifting a position of the student signal with the position of information data position of the teacher signal being gradually changed with respect to the information data position of the student signal, a third step of selecting a plurality of information data located in periphery of a target position in the teacher signal, based on the student signal having a position shifted in the second step, a fourth step of producing a normal equation for obtaining the coefficient seed data using the plurality of the information data selected in the third step and the information data at the target position in the teacher signal, and a fifth step of solving the normal equation produced in the fourth step to obtain the coefficient seed data.

Further, an information-providing medium in accordance with the present invention provides a computer program for executing each step in the method for producing the coefficient seed data described above.

According to the present invention, the thinning-out processing is performed on the teacher signal to obtain the student signal. When the 1050i signal is illustratively used as the teacher signal, the thinning-out processing is performed on the 1050i signal to obtain 525i signal as the student signal. Then, the phase position of the student signal is shifted with a position of the information data position of the teacher signal being gradually changes with respect to the information data position of the student signal.

A plurality of information data located in periphery of the target position in the teacher signal is selected on the basis of the position-shifted student signal. Then, by use of thus-selected plurality of information data and the information data of the target position in the teacher signal, a normal equation for obtaining the coefficient seed data is produced. This equation is then solved to obtain the coefficient seed data.

Herein, the coefficient seed data is coefficient data in the production equation for producing coefficient data to be used in the estimated equation employed when converting the first information signal into the second information signal, the production equation using the position information as a parameter. Using this coefficient seed data allows the coefficient data corresponding to arbitrary position information to be obtained according to the production equation. As a result of this, when converting the format or the size, the coefficient data of the estimated equation is produced from the coefficient seed data on the basis of the position information about the target position in the second information signal so that it can obtain the information data of the target position using thus-produced coefficient data.

Further, a coefficient seed data production device in accordance with the present invention for producing coefficient seed data, the coefficient seed data being coefficient data in production equation for producing coefficient data to be used in estimated equation employed when converting a first information signal including a plurality of information data into a second information signal including a plurality of information data, and the production equation using position information as a parameter, comprises signal processing means for performing a thinning-out processing on a teacher signal to obtain a student signal, position shift means for shifting a position of the student signal with a position of information data position of the teacher signal being gradually changed with respect to the information data position of the student signal, first data selection means for selecting a plurality of first information data located in periphery of a target position in the teacher signal, based on the student signal having a position shifted by the position shift means, first normal equation production means for producing a first normal equation for obtaining the coefficient data of the estimated equation per position shift value of the student signal using the plurality of the first information data selected in the first data selection means and the information data at the target position in the teacher signal, coefficient data calculation means for solving the first normal equation to obtain the coefficient data of the estimated equation per the position shift value, second normal equation production means for producing a second normal equation for obtaining the coefficient seed data using the coefficient data per the position shift value obtained in the coefficient data calculation means, and coefficient seed data calculation means for solving the second normal equation to obtain the coefficient seed data.

Further, a method for producing coefficient seed data in accordance with the present invention for producing coefficient seed data, the coefficient seed data being coefficient data in production equation for producing coefficient data to be used in estimated equation employed when converting a first information signal including a plurality of information data into a second information signal including a plurality of information data, and the production equation using the position information as a parameter, comprises a first step of performing a thinning-out processing on a teacher signal to obtain a student signal, a second step of shifting a position of the student signal with position of information data position of the teacher signal being gradually changed with respect to the information data position of the student signal, a third step of selecting a plurality of information data located in periphery of a target position in the teacher signal, based on the student signal having a position shifted in the second step, a fourth step of producing a first normal equation for obtaining the coefficient data of the estimated equation per position shift value of the student signal using the plurality of the information data selected in the third step and the information data at the target position in the teacher signal, a fifth step of solving the first normal equation produced in the fourth step to obtain the coefficient data of the estimated equation per the position shift value, a sixth step of producing a second normal equation for obtaining the coefficient seed data using the coefficient data per the position shift value obtained in the fifth step, and a seventh step of solving the second normal equation produced in the sixth step to obtain the coefficient seed data.

Further, an information-providing medium in accordance with the present invention provides a computer program for executing each step in the method for producing the coefficient seed data described above.

According to the present invention, the thinning-out processing is performed on the teacher signal to obtain the student signal. When the 1050i signal is illustratively used as the teacher signal, the thinning-out processing is performed on the 1050i signal to obtain 525i signal as the student signal. Then, the position of the student signal is shifted with the position of the information data position of the teacher signal being gradually changes with respect to the information data position of the student signal.

A plurality of information data located in periphery of the target position in the teacher signal is selected on the basis of the position-shifted student signal. Then, by use of thus-selected plurality of information data and the information data of the target position in the teacher signal, a first normal equation for obtaining the coefficient data of the estimated equation is produced at every position shift value of the student signal. This equation is then solved to obtain coefficient data of the estimated equation at every position shift value.

Further, by use of the coefficient data at every position shift value, a second normal equation for obtaining coefficient seed data is produced. This equation is then solved so as to obtain coefficient seed data.

Herein, the coefficient seed data is coefficient data in the production equation for producing the coefficient data to be used in the estimated equation employed when converting the first information signal into the second information signal, the production equation using the position information as parameter. Using this coefficient seed data allows the coefficient data corresponding to arbitrary position information to be obtained according to the production equation. As a result of this, at the time of the format or size conversion, the coefficient data of the estimated equation is produced according to the coefficient seed data based on the position information about the target position in the second information signal. Then, by use of thus-produced coefficient data, it becomes possible to obtain the information data of the target position.

BRIEF DESCRIPTION OF THE DRAWINGS

FIG. 3 is a diagram showing a positional relationship between the pixels of the 525i signal (the SD signal) and the pixels of the 1050i signal (the HD signal);

FIG. 7 is a block diagram showing an exemplary structure of a coefficient seed data production device;

FIG. 9 is a block diagram showing another exemplary structure of a coefficient seed data production device;

FIG. 18 is a diagram showing a position relationship in a vertical direction between the pixels of the 525i signal and the pixels of the XGA signal.

FIG. 19 is a diagram showing a position relationship in a horizontal direction between the pixels of the 525i signal and the pixels of the XGA signal.

BEST MODE FOR CARRYING OUT THE INVENTION

Figure 1:
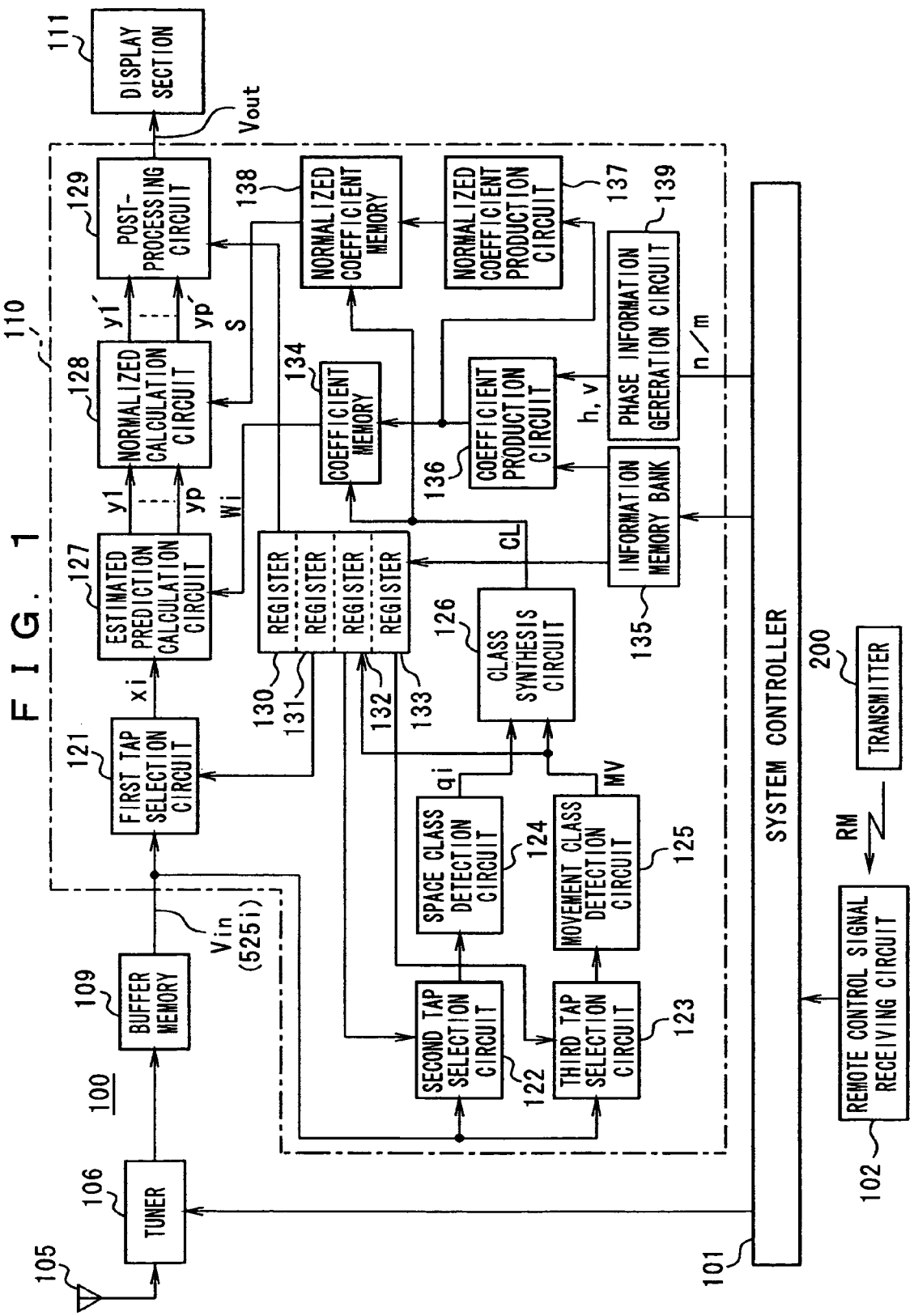
FIG. 1 is a block diagram showing a configuration of television receiver as an embodiment.

Hereinafter, embodiments of the present invention will be described with reference to drawings. FIG. 1 shows a configuration of television receiver 100 as an embodiment. The television receiver 100 receives a 525i signal from a broadcast signal and converts the 525i signal into a 1080i signal or a XGA signal so as to display an image, or converts the 525i signal into a new 525i signal for partially magnifying the image by an arbitrary magnification and displaying the partially magnified image.

The television receiver 100 comprises a system controller 101 with a microcomputer for controlling operations of the entire system, and a remote control signal receiving circuit 102 for receiving a remote control signal. The remote control signal receiving circuit 102 is connected to the system controller 101, and it is constituted so as to receive a remote control signal RM from a remote control transmitter 200 in accordance with the user operation and to supply an operation signal corresponding to the received signal RM to the system controller 101.

The television receiver 100 also comprises a receiving antenna 105, a tuner 106 for receiving a broadcast signal (RF modification signal) captured by the receiving antenna 105, and performing processing such as a channel selection, a middle frequency amplification, and a wave detection so as to obtain a 525i signal, and a buffer memory 109 for temporarily storing the 525i signal output from the tuner 106.

The television receiver 100 further comprises an image signal processing section 110 for using the 525i signal temporarily stored in the buffer memory 109 as an input image signal Vin and converting the 525i signal into a 1080i signal or a XGA signal, or converting it into a new 525i signal for partially magnifying the image by an arbitrary magnification and displaying the partially magnified image, and then transmitting the resultant signal, and a display section 111 for displaying an image produced by the output image signal Vout received from the image signal processing section 110. The display section 111 is constituted by, for example, a display apparatus such as a cathode-ray tube (CRT) display, a liquid crystal display (LCD).

An operation of the television receiver 100 shown in FIG. 1 will be described.

The 525i signal transmitted from the tuner 106 is supplied to the buffer memory 109, which temporarily stores it. The 525i signal stored in the buffer memory 109 is supplied to the image signal processing section 110 as an input image signal Vin.

In the image signal processing section 110, in response to the setting by the user through operations of the remote control transmitter 200, the 525i signal as the input image signal Vin is converted into a 1080i signal or a XGA signal, or the 525i signal is converted into a new 525i signal for partially magnifying the image by an arbitrary magnification and displaying the partially magnified image. The output image signal Vout transmitted from the image signal processing section 110 is supplied to the display section 111, which displays an image produced by the output image signal Vout on the screen thereof.

Next, details of the image signal processing section 110 will be described. The image signal processing section 110 includes first to third tap selection circuits 121 to 123 each for selectively extracting a plurality of pixel data located in periphery of each pixel (target pixel) within a unit pixel block constituting the output image signal Vout from the 525i signal stored in the buffer memory 109, and then transmitting them.

The first tap selection circuit 121 selectively extracts data of the pixel for use in prediction (hereinafter, referred to as "prediction tap"). The second tap selection circuit 122 selectively extracts data of the pixel for use in sorting space classes (hereinafter, referred to as "space class tap"). The third tap selection circuit 123 selectively extracts data of pixel for use in sorting movement classes (hereinafter, referred to as "movement class tap"). Where the space class is determined using the pixel data belonging to the plural fields, this space class also contains information about movements.

The image signal processing section 110 also includes a space class detection circuit 124 for detecting a distribution pattern of levels of data of space class tap (two or more) selectively extracted in the second tap selection circuit 122, and detecting a space class based on the distribution pattern of the levels so as to transmit information about the class.

The space class detection circuit 124 performs an operation such that, for example, the space class tap data is compressed from 8 bit-data into 2 bit-data. Then, the space class detection circuit 124 transmits the compressed data each corresponding to the space class tap data as class information of the space class. In this embodiment, data compression is performed according to an adaptive dynamic range coding (ADRC) method. Alternative to ADRC, as a method for compressing information, also employable is prediction coding such as differential pulse code modulation (DPCM), vector quantization (VQ) and the like.

Originally, ADRC is an adaptive re-quantization method, which has been developed for use in high performance coding for video tape recorder (VTR). The ADRC is also preferable to a case used in the data compression described above because this method is capable of effectively expressing a local pattern of a signal level in a short language. In the case of employing ADRC, defining the maximum value of the space class tap data as MAX, the minimum value thereof as MIN, a dynamic range of the space class tap data as DR (=MAX−MIN+1), and re-quantized bit number as P, a re-quantized code qi as compressed data is obtained from an operation in following Equation (1) as to each space class tap data ki.

$$qi = [(ki - MIN + 0.5) \cdot 2^P / DR]. \qquad (1)$$

In the Equation (1), the portion enclosed with [ ] means truncation process. When there is pixel data in the number of Na as the space class tap data, i is set to 1 to Na.

The image signal processing section 110 also includes an movement class detection circuit 125 for detecting a movement class for mainly expressing the degree of movement, from the movement class tap data (two or more) selectively extracted in the third tap selection circuit 123, and then transmitting the class information thereof.

In the movement class detection circuit 125, a differential between frames is calculated from the movement class tap data selectively extracted in the third tap selection circuit 123. Then, a threshold value processing is performed on an average value of the absolute values of differentials so that the movement class, which is an index of movement, can be detected. Specifically, in the movement class detection circuit 125, an average value AV of the absolute values of the differentials is calculated in following Equation (2).

$$AV = \frac{\sum_{i=1}^{Nb} |mi - ni|}{Nb} \qquad (2)$$

When six pixel data m1 to m6 and six pixel data n1 to n6 located in the immediately preceding frame are extracted as class tap data, for example, in the third tap selection circuit 123, Nb in the Equation (2) is 6.

In the movement class detection circuit 125, the average value AV calculated as described above is compared with one or a plurality of threshold values so as to allow class information MV about movement class to be obtained. For example, when three threshold values th1, th2, th3 (th1<th2<th3) are prepared and four movement classes are to be detected, MV is set to 0 when AV≦th1; MV is set to 1 when th1<AV≦th2; MV is set to 2 when th2<AV≦th3; and MV is set to 3 when th3<AV.

The image signal processing section 110 also includes a class synthesis circuit 126 for obtaining a class code CL showing a class including the data of each pixel (target pixel) within the unit pixel block constituting the output image signal Vout to be produced, based on the re-quantized code qi as class information about the space class received from the space class detection circuit 124 and the class information MV about the movement class received from the movement class detection circuit 125.

In the class synthesis circuit 126, the class code CL is calculated in following Equation (3).

$$CL = \sum_{i1}^{N} qi(2^P)^{i1} + MV \cdot (2^P)^{Na} \qquad (3)$$

In the Equation (3), Na indicates the number of space class tap data, and P indicates the re-quantized bit number in ADRC method.

The image signal processing section 110 also includes registers 130 to 133 and a coefficient memory 134. A post-processing circuit 129, which will be described later, is required to change its operation among the case where a 1080i signal is transmitted as the output image signal Vout, the case where an XGA signal is transmitted as the output image signal Vout, and the case where a 525i signal is transmitted as the output image signal Vout. The register 130 stores operation specifying information for specifying operations of the post-processing circuit 129. The post-processing circuit 129 exhibits the operations in compliance with the operation specifying information supplied from the register 130.

The register 131 stores information about the tap position of the prediction tap to be selected in the first tap selection circuit 121. The first tap selection circuit 121 selects the prediction tap in compliance with the tap position information supplied from the register 131. The tap position information assigns numbers to the plurality of pixels which may be selected for example, and specifies the number of pixel to be selected. The tap position information described hereinafter also performs the same operation as described above.

The register 132 stores tap position information of the space class tap to be selected in the second tap selection circuit 122. The second tap selection circuit 122 selects the space class tap in compliance with the tap position information supplied from the register 132.

Therein, the register 132 stores tap position information A of the case where a movement is relatively small, and tap position information B of the case where a movement is relatively large. Which of the tap position information A or B is to be supplied to the second tap selection circuit 122 is determined by the class information MV of the movement class transmitted from the movement class detection circuit 125.

Specifically, if MV is 0 or MV is 1 because there is no movement or the movement is small, the tap position information A is supplied to the second tap selection circuit 122. The space class tap selected in the second tap selection circuit 122 is made to extend over plural fields. Contrarily, if MV is 2 or MV is 3 because the movement is relatively large, the tap position information B is supplied to the second tap selection circuit 122. Although not shown in the drawings, the space class tap selected in the second tap selection circuit 122 is made to be only the pixel within the field where the pixel to be produced is present.

Alternatively, it is also possible that the register 131 described above also stores the tap position information of the case where the movement is relatively small and the tap position information of the case where the movement is relatively large, so that the tap position information to be supplied to the first tap selection circuit 121 can be selected by the class information MV of the movement class transmitted from the movement class detection circuit 125.

The register 133 stores the tap position information of the movement class tap to be selected in the third tap selection circuit 123. The third tap selection circuit 123 selects a movement class tap in compliance with the tap position information supplied from the register 133.

The coefficient memory 134 stores, for each class, the coefficient data of the estimated equation to be used in an estimated prediction calculation circuit 127, which will be described later. The coefficient data is information for converting the 525i signal into the 1080i signal or the XGA signal, or for converting the 525i signal into a new 525i signal for partially magnifying the image by an arbitrary magnification and displaying the partially magnified image. The coefficient memory 134 receives the class code CL from the class synthesis circuit 126 described above as read address information. Coefficient data corresponding to the class code CL is read out of the coefficient memory 134, and thus read coefficient data is supplied to the estimated prediction calculation circuit 127.

The image signal processing section 110 also includes an information memory bank 135. In the information memory bank 135, movement specifying information to be stored into the register 130 and the tap position information to be stored in the registers 131 to 133 are stored beforehand.

Herein, as the movement specifying information to be stored in the register 130, first movement specifying information for operating the post-processing circuit 129 to transmit the 1080i signal, second movement specifying information for operating the post-processing circuit 129 to transmit the XGA signal, and third movement specifying information for operating the post-processing circuit 129 to transmit the 525i signal, are stored beforehand in the information memory bank 135.

The user can make selection among the first conversion method for transmitting the 1080i signal, the second conversion method for transmitting the XGA signal, or the third conversion method for transmitting the 525i signal, by operating the remote control transmitter 200. In the case of selecting the third conversion method, the user can further specify the magnification (the image size) of the image to be displayed. The information memory bank 135 receives the selection information about the conversion method to be selected from the system controller 101. The information memory bank 135 loads the first, second, or third movement specifying information in compliance with the received selection information into the register 130.

In the information memory bank 135, first tap position information corresponding to the first conversion method (1080i), second tap position information corresponding to the second conversion method (XGA), and third tap position information corresponding to the third conversion method (525i), are stored beforehand as the tap position information of the prediction tap to be stored in the register 131. The information memory bank 135 loads the first, second, or third tap position information into the register 131 in compliance with the selection information about the conversion method described above.

It is also possible that tap position information corresponding to the magnification of the image to be displayed is stored into the information memory bank 135 beforehand as the third tap position information corresponding to the third conversion method, and at the same time when the third conversion method is selected, the tap position information corresponding to the specified magnification is loaded from the information memory bank 135 into the register 131. The same thing is applicable to the case where the tap information is loaded into registers 132 and 133, which will be described later.

Further, the first tap position information corresponding to the first conversion method (1080i), the second tap position information corresponding to the second conversion information (XGA), and the third tap position information corresponding to the third conversion method (525i) are stored beforehand in the information memory bank 135 as tap position information of the space class tap to be stored into the register 132. The first, second, and third tap position information is respectively constituted by tap position information for the case where a movement is relatively small, and tap position information for the case where a movement is relatively large. The first, second, or third tap position information is loaded from the information memory bank 135 into the register 132 in compliance with the selection information about the conversion method described above.

Further, the first tap position information corresponding to the first conversion method (1080i), the second tap position information corresponding to the second conversion method (XGA), and the third tap position information corresponding to the third conversion method (525i) are stored beforehand in the information memory bank 135 as tap position information of the movement class tap to be stored in the register 133. The first, second, or third tap position information is loaded from the information memory bank 135 into the register 133 in compliance with the selection information about the conversion method described above.

Further, the information memory bank 135 stores coefficient seed data of each class beforehand. The coefficient seed data is coefficient data of the production equation for producing coefficient data to be stored into the coefficient memory 134 described above, the production equation using the position information as a parameter.

In the estimated prediction calculation circuit 127, which will be described later, pixel data y to be produced is calculated according to the estimated equation of Equation (4) from prediction tap data xi and the coefficient data Wi read out of the coefficient memory 134.

$$y = \sum_{i=1}^{n} Wi \cdot xi \quad (4)$$

When ten prediction taps are selected in the first tap selection circuit 121, n in the Equation (4) is 10.

Then, the coefficient data Wi (i=1 to n) of this estimated equation is produced according to the production equation using the phase position information h, v as the parameter, as shown in following Equation (5) for example.

$$W_1 = w_{10} + w_{11}v + w_{12}h + w_{13}v^2 + w_{14}vh + w_{15}h^2 + w_{16}v^3 + w_{17}v^2h + w_{18}vh^2 + w_{19}h^3$$

$$W_2 = w_{20} + w_{21}v + w_{22}h + w_{23}v^2 + w_{24}vh + w_{25}h^2 + w_{26}v^3 + w_{27}v^2h + w_{28}vh^2 + w_{29}h^3$$

$$W_i = w_{i0} + w_{i1}v + w_{i2}h + w_{i3}v^2 + w_{i4}vh + w_{i5}h^2 + w_{i6}v^3 + w_{i7}v^2h + w_{i8}vh^2 + w_{i9}h^3$$

$$W_n = w_{n0} + w_{n1}v + w_{n2}h + w_{n3}v^2 + w_{n4}vh + w_{n5}h^2 + w_{n6}v^3 + w_{n7}v^2h + w_{n8}vh^2 + w_{n9}h^3 \quad (5)$$

In the information memory bank 135, coefficient seed data $W_{10}$ to $W_{n9}$, which is coefficient data of this production equation, is stored per class. The method for producing the coefficient seed data will be described later.

The image signal processing section 110 also includes a coefficient production circuit 136 for producing, for each class, the coefficient data Wi (i=1 to n) of the estimated equation corresponding to the values of the position information h, v according to the Equation (5) using the coefficient seed data of each class and each value of the position information h, v. The coefficient seed data of each class is loaded into this coefficient production circuit 136 from the information memory bank 135. In addition, the position information h, v in the horizontal direction and the vertical direction of each pixel within the unit pixel block constituting the output image signal Vout generated in a position information generation circuit 139, which will be described later, is supplied to the coefficient production circuit 136. The coefficient data Wi (i=1 to n) each corresponding to the position information h, v of each class produced in the coefficient production circuit 136 is stored in the coefficient memory 134 described above.

The image signal processing section 110 also includes a phase position information generation circuit 139 for generating the phase position information h, v in the horizontal direction and the vertical direction of each pixel within the unit pixel block constituting the output image signal Vout, based on the selection information about the conversion method and the corresponding function information n/m relating to the number of pixels in each field in the vertical direction and in the horizontal direction in the input image signal Vin and the output image signal Vout corresponding to the information for specifying the magnification, which are received from the system controller 101. This position information generation circuit 139 is constituted by a ROM table, for example.

The position information h, v in the horizontal direction and the vertical direction of each pixel generated in the position information generation circuit 139 is respectively associated with the pixel number (tap number) and then supplied to the coefficient production circuit 136. The position information generation circuit 139 generates the position information h, v corresponding to the respective odd and even fields of the input image signal Vin.

Figure 14:
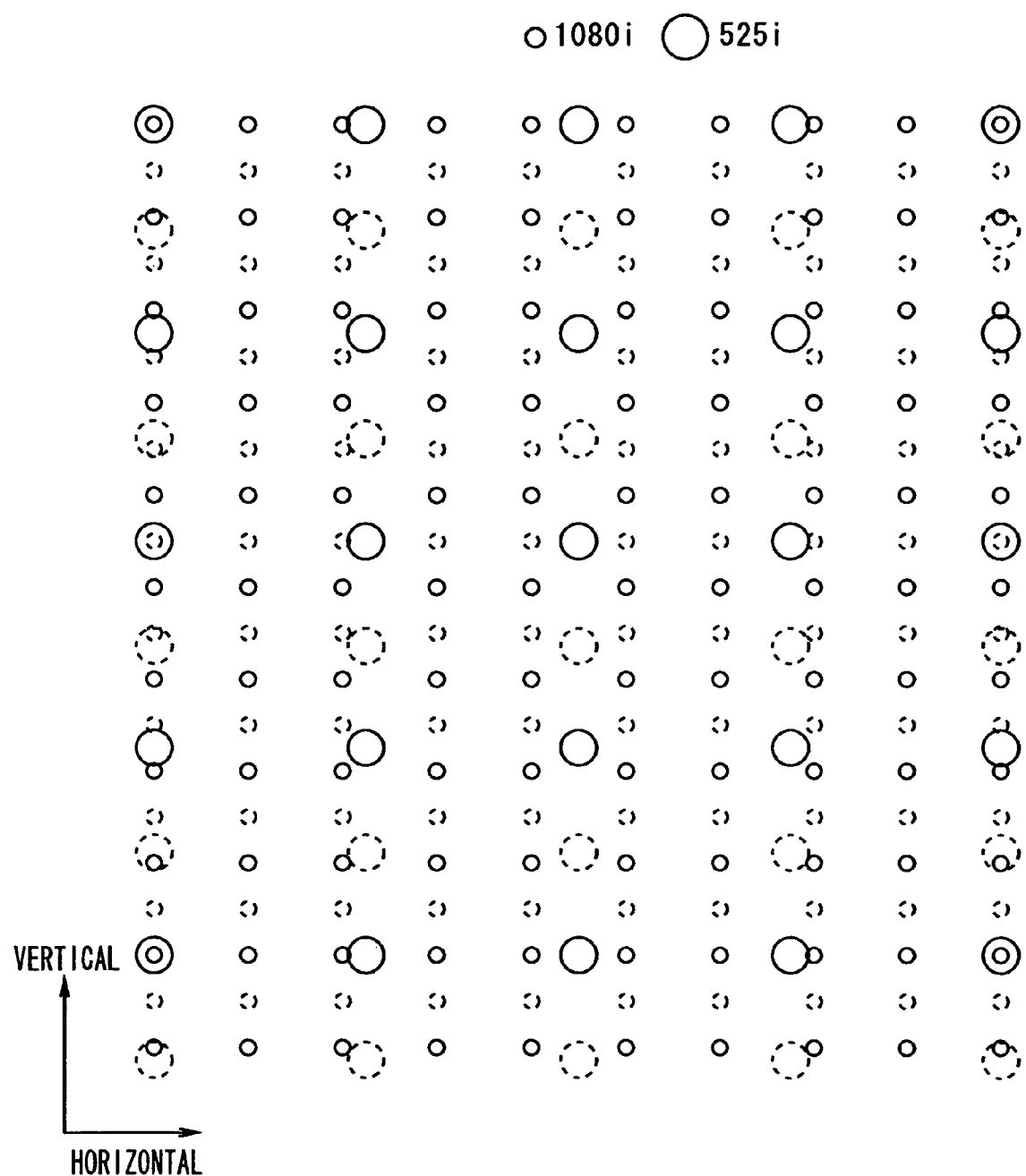
FIG. 14 is a diagram showing a positional relationship between the pixels of the 525i signal and the pixels of the 1080i signal.
Figure 15:
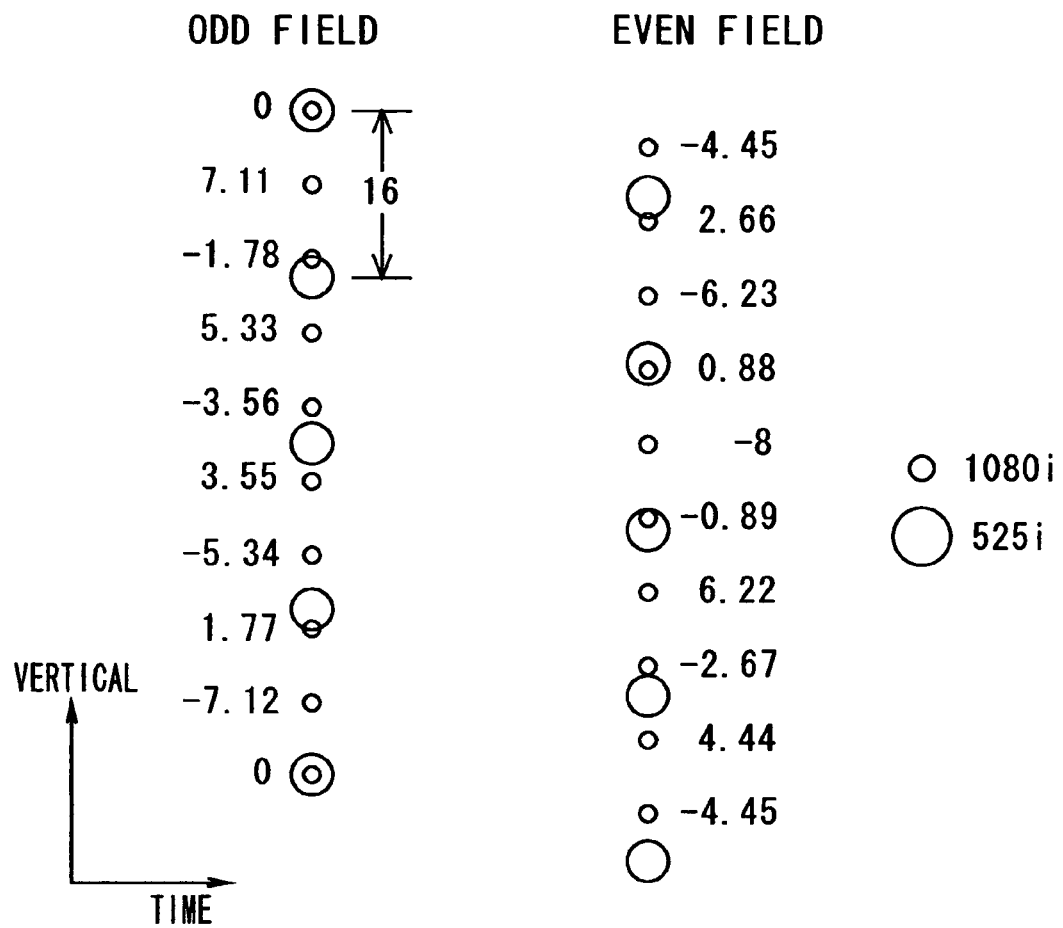
FIG. 15 is a diagram showing a position relationship in a vertical direction between the pixels of the 525i signal and the pixels of the 1080i signal.
Figure 16:
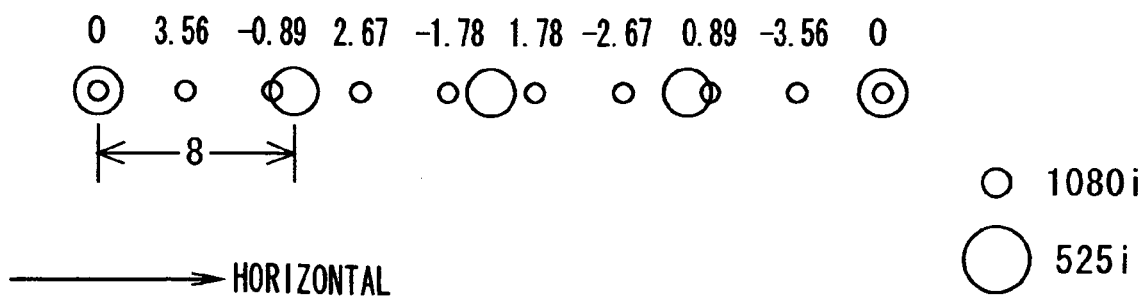
FIG. 16 is a diagram showing a position relationship in a horizontal direction between the pixels of the 525i signal and the pixels of the 1080i signal.

For example, when the first conversion method (1080i) is selected, n/m is 9/4 as to the vertical direction, and n/m is 9/4 as to the horizontal direction (see FIG. 14). As a result, the 9×9 pixel block of the 1080i signal as the output image signal Vout corresponds to the 4×4 pixel block of the 525i signal as the input image signal Vin. In this case, the unit pixel block constituting the output image signal Vout is a 9×9 pixel block.

In this case, in the position information generation circuit 139, as to each pixel within this 9×9 unit pixel block, a distance between pixels located at positions closest to each other in the vertical direction (pixels at a shortest distance) is obtained among the pixels within the 4×4 pixel block of the 525i signal described above, and the obtained value of the distance is used as position information v; and a distance between pixels located at positions closest to each other in the horizontal direction (pixels at a shortest distance) is obtained, and the obtained value of the distance is used as position information h. In this embodiment, the position information h, v described above is obtained under the condition where the interval between pixels in the vertical direction of the 525i signal is set to 16, and the interval between pixels in the horizontal direction thereof is set to 8. The same thing is applied to the case where the second and third conversion methods are selected respectively.

Herein, the position information v is set to a negative value when the target pixel within the 9×9 unit pixel block is located at a position upper than the pixel at the shortest distance. Contrarily, the position information v is set to a positive value when the target pixel within the 9×9 unit pixel block is located at a position lower than the pixel at the shortest distance described above. In addition, the position information h is set to a negative value when the target pixel thereof is located at a position left of the pixel at the shortest distance. Contrarily, the position information h is set to a positive value when the target pixel thereof is located at a position right of the pixel at the shortest distance. The same thing is applied to the case where the second and third conversion methods are selected, respectively.

As described above, when the first conversion method (1080i) is selected, in the position information generation circuit 139, the position information h, v is generated for each of 81 pixels, which constitute the 9×9 unit pixel block, in correspondence with the respective odd and even fields.

Figure 17:
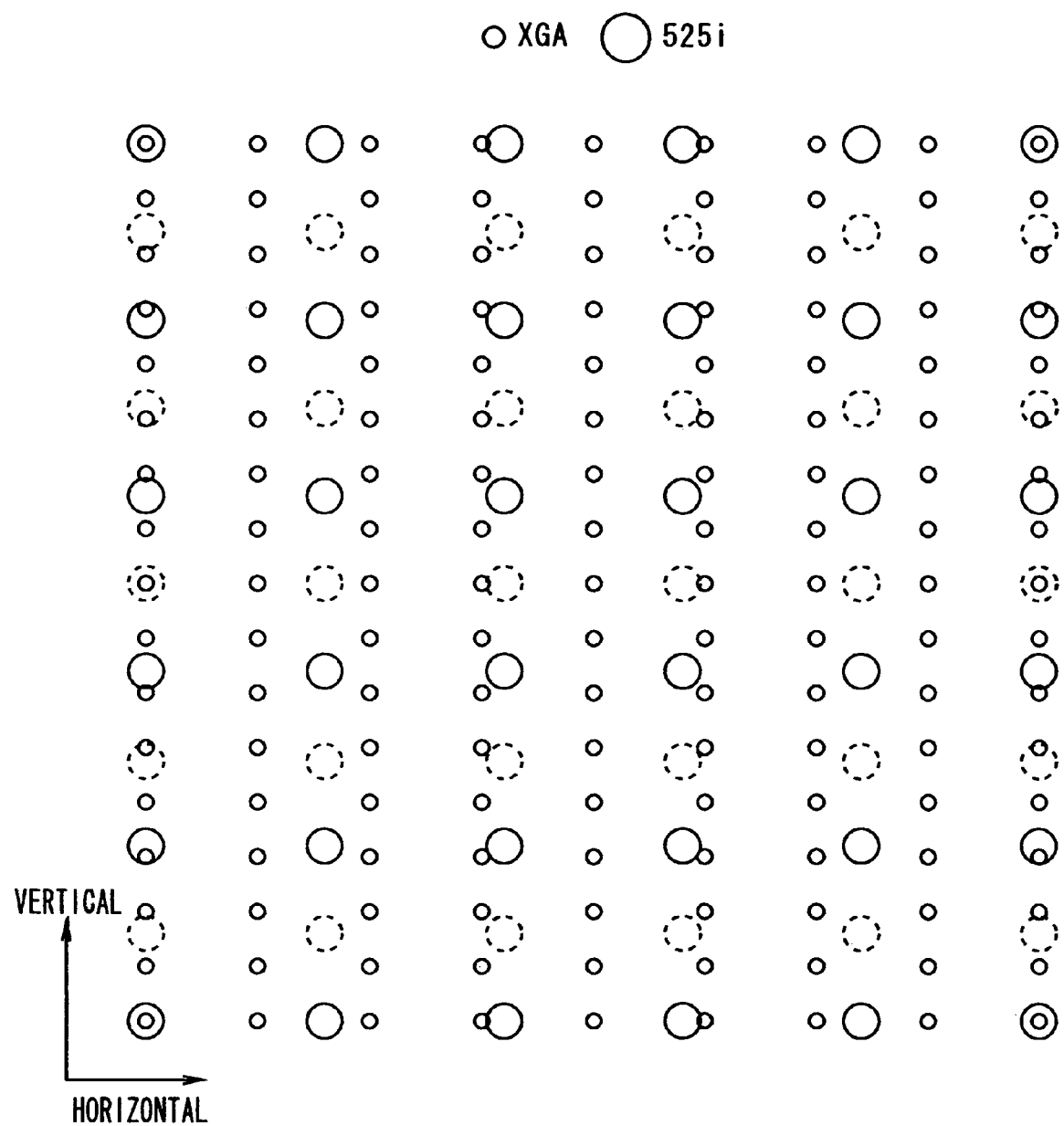
FIG. 17 is a diagram showing a positional relationship between the pixels of the 525i signal and the pixels of the XGA signal.

In addition, when the second conversion method (XGA) is selected for example, n/m is 16/5 as to the vertical direction, and n/m is 8/5 as to the horizontal direction (see FIG. 17). As a result, the 8×16 pixel block of the XGA signal as the output image signal Vout corresponds to the 5×5 pixel block of the 525i signal as the input image signal Vin. In this case, the unit pixel block constituting the output image signal Vout is a 8×16 pixel block.

In this case, in the position information generation circuit 139, as to each pixel within this 8×16 unit pixel block, a distance between pixels located at positions closest to each other in the vertical direction (pixels at a shortest distance) is obtained among the pixels within the 5×5 pixel block of the 525i signal described above, and the obtained value of the distance is used as position information v; and a distance between pixels located at positions closest to each other in the horizontal direction (pixels at a shortest distance) is obtained, and the obtained value of the distance is used as position information h.

As described above, when the second conversion method (XGA) is selected, in the position information generation circuit 139, the position information h, v is generated for each of 128 pixels, which constitute the 8×16 unit pixel block, in correspondence with the respective odd and even fields.

In addition, when the third conversion method (525i) is selected for example, the values of n/m in the vertical direction and in the horizontal direction are uniquely determined in correspondence with the specified magnification of the image to be displayed (the image size). Assuming that n/m is nv/mv as to the vertical direction and n/m is nh/mh as to the horizontal direction, nh×nv pixel block of the 525i signal as the output image signal Vout corresponds to the mh×mv pixel block of the 525i signal as the input image signal Vin. In this case, the unit pixel block constituting the output image signal Vout is a nh×nv pixel block.

In this case, in the position information generation circuit 139, as to each pixel within this nh×nv unit pixel block, a distance between pixels located at positions closest to each other in the vertical direction (pixels at a shortest distance) is obtained among the pixels within the nh×mv pixel block of the 525i signal as the input image signal Vin described above, and the obtained value of the distance is used as position information v; and a distance between pixels located at positions closest to each other in the horizontal direction (pixels at a shortest distance) is obtained, and the obtained value of the distance is used as position information h.

As described above, when the third conversion method (525i) is selected, in the position information generation circuit 139, the phase position information h, v is generated for each of the pixels, which constitute the nh×nv unit pixel block, in correspondence with the respective odd and even fields.

The image signal processing section 110 also includes a normalized coefficient production circuit 137 for calculating according to following Equation (6) a normalized coefficient S corresponding to the coefficient data Wi (i=1 to n) of the respective phase position information h, v of each class produced by the coefficient production circuit 136, and a normalized coefficient memory 138 for storing thus-produced normalized coefficient S per class. The normalized coefficient memory 138 receives the class code CL from the aforementioned class synthesis circuit 126 as read address information. The normalized coefficient S corresponding to the class code CL is read out of the normalized coefficient memory 138, and then thus read normalized coefficient S is supplied to a normalized calculation circuit 128, which will be described later.

$$S = \sum_{i=1}^{n} Wi \qquad (6)$$

The image signal processing section 110 also includes the estimated prediction calculation circuit 127 for calculating data of each pixel within the unit pixel block constituting the output image signal Vout, based on the prediction tap data xi selectively extracted in the first tap selection circuit 121 and the coefficient data Wi read out of the coefficient memory 134.

In this estimated prediction calculation circuit 127, pixel data constituting the output image signal Vout is produced for every unit pixel block. Specifically, the estimated prediction calculation circuit 127 receives the prediction tap data xi corresponding to each pixel within the unit pixel block (target pixel) from the first tap selection circuit 121 and the coefficient data Wi corresponding to each pixel constituting the unit pixel block from the coefficient memory 134. The data of each pixel constituting the unit pixel block is calculated separately according to the estimated equation of the aforementioned Equation (4).

For example, in the estimated prediction calculation circuit 127, when the first conversion method (1080i) is selected, data of 81 pixels constituting the unit pixel block is simultaneously produced; when the second conversion method (XGA) is selected, data of 128 pixels constituting the unit pixel block is simultaneously produced; and when the third conversion method (525i) is selected, data of pixels in the number of (nh×nv) constituting the unit pixel block (the values of nh and nv change in accordance with the specified magnification of the image to be displayed) is simultaneously produced.

The image signal processing section 110 also includes a normalized calculation circuit 128 for normalizing with dividing the data $y_1$ to $y_p$ (P shows the number of pixels constituting the unit block) of each pixel within the unit pixel block constituting the output image signal Vout, each data $y_1$ to $y_p$ being sequentially output from the estimated prediction calculation circuit 127, by the normalized coefficient S corresponding to the coefficient data Wi (i=1 to n) which is read from the normalized coefficient memory 138 and is used in the production of the respective data $y_1$ to $y_p$. Although not described above, when the coefficient production circuit 136 produces the coefficient data of the estimated equation from the coefficient seed data according to the production equation, the produced coefficient data contains a rounding error, and there is no guarantee that the sum of the coefficient data Wi (i=1 to n) is 1.0. Therefore, the data $y_1$ to $y_p$ of each pixel calculated in the estimated prediction calculation circuit 127 involves a level fluctuation as a result of rounding error. As described above, the fluctuation can be removed by normalizing them in the normalized calculation circuit 128.

In addition, the image signal processing section 110 also includes the post-processing circuit 129 for processing the data $y_1'$ to $y_p'$ of the pixels within the unit pixel block normalized in the normalized calculation circuit 128 and sequentially received therefrom, and transmitting the output image signal Vout with the format specified by any one of the first to third conversion methods. Specifically, the post-processing circuit 129 transmits the 1080i signal when the first conversion method is selected, transmits the XGA signal when the second conversion method is selected, and transmits the 525i signal when the third conversion method is selected. The information for specifying the operation of the post-processing circuit 129 is supplied from the register 130 as described above.

Next, an operation of the image signal processing section 110 will be described.

In the second tap selection circuit 122, space class tap data (pixel data) located in periphery of each pixel (target pixel) within the unit pixel block constituting the output image signal Vout to be produced is selectively extracted from the 525i signal stored in the buffer memory 109 as the input image signal Vin. In this case, in the second tap selection circuit 122, the selection of tap is performed, based on the conversion method supplied from the register 132 and selected by the user, and the tap position information corresponding to the movement class detected in the movement class detection circuit 125.

Thus-obtained space class tap data is supplied to the space class detection circuit 124. In the space class detection circuit 124, each pixel data as the space class tap data is subjected to an ADRC processing so that a re-quantized code qi as class information of the space class (a class sort mainly for the purpose of expressing the waveform in a space) may be obtained (see the Equation (1)).

In addition, in the third tap selection circuit 123, movement class tap data (pixel data) located in periphery of the pixels within the unit pixel block (target pixel) constituting the output image signal Vout to be produced is selectively extracted from the 525i signal stored in the buffer memory 109 as the input image signal Vin. In this case, in the third tap selection circuit 123, the selection of tap is performed on the basis of the tap position information selected by the user and supplied from the register 133, the tap position information corresponding to the conversion method.

Thus-obtained movement class tap data is supplied to the space class detection circuit 125. According to the movement class detection circuit 125, class information MV about a movement class (a class sort mainly for the purpose of expressing the degree of movement) is obtained from each pixel data as movement class tap data.

Thus-obtained movement information MV and the aforementioned re-quantized code qi are supplied to the class synthesis circuit 126. In the class synthesis circuit 126, a class code CL showing a class including data of each pixel within a unit pixel block (target pixel) is obtained from the movement information MV and the re-quantized code qi, as to each unit pixel block constituting the output image signal Vout to be produced (see the Equation (3)). Then, thus-obtained class code CL is supplied to the coefficient memory 134 and the normalized coefficient memory 138 as read address information.

The coefficient production circuit 136 produces coefficient data Wi (i=1 to n) of the estimated equation in each class corresponding to the position information h, v of each pixel within the unit pixel block constituting the output image signal Vout generated in the position information generation circuit 139, and then the coefficient data Wi is stored in the coefficient memory 134. In addition, the normalized coefficient production circuit 137 produces normalized coefficient S corresponding to the coefficient data Wi (i=1 to n) in each class and in each position information produced by the coefficient production circuit 136 as described above, and then the normalized coefficient S is stored in the normalized coefficient memory 138.

When the class code CL is supplied as read address information to the coefficient memory 134 as described above, the coefficient data Wi in each position information corresponding to the class code CL is read out of the coefficient memory 134 and then thus read coefficient data Wi is supplied to the estimated prediction calculation circuit 127. In addition, in the first tap selection circuit 121, prediction tap data (pixel data) located in periphery of each pixel (target pixel) within the unit pixel block constituting the output image signal Vout to be produced is selectively extracted from the 525i signal stored in the buffer memory 109 as the input image signal Vin. In this case, in the first tap selection circuit 121, the selection of tap is performed on the basis of the tap position information corresponding to the conversion method selected by the user and supplied from the register 131. The prediction tap data xi is supplied to the estimated prediction calculation circuit 127.

In the estimated prediction calculation circuit 127, data y1 to yp of each pixel within the unit pixel block constituting the output image signal Vout to be produced is simultaneously calculated, from the prediction tap data xi and the coefficient data Wi in each position information read out of the coefficient memory 134 (see the Equation (4)). The data y1 to yp of each pixel within the unit pixel block constituting the output image signal Vout and sequentially transmitted from the estimated prediction calculation circuit 127, is supplied to the normalized calculation circuit 128.

As described above, the class code CL is supplied to the normalized coefficient memory 138 as read address information. Out of the normalized coefficient memory 138, read is the normalized coefficient S corresponding to the class code CL, that is, the normalized coefficient S corresponding to the coefficient data Wi which has been used in calculating the data $y_1$ to $y_p$ output from the estimated prediction calculation circuit 127. Thus read normalized coefficient S is supplied to the normalized calculation circuit 128. In the normalized calculation circuit 128, the data $y_1$ to $y_p$ transmitted from the estimated prediction calculation circuit 127 is normalized with dividing them by their respectively corresponding normalized coefficients S. This removes the level fluctuation of the data $y_1$ to $y_p$ caused by rounding error occurred when the coefficient data of the estimated equation (see the Equation (4)) is obtained according to the production equation (see the Equation (5)) using the coefficient seed data.

The data $y_1'$ to $y_p'$ of each pixel within the unit pixel block, which is normalized in the normalized calculation circuit 128 and sequentially transmitted therefrom, is supplied to the post-processing circuit 129. The post-processing circuit 129 receives the data $y_1'$ to $y_p'$ and transmits them with a format specified by any one of the first to third conversion methods as the output image signal Vout. When the first conversion method is selected, the 1080i signal is transmitted as the output image signal Vout. When the second conversion method is selected, the XGA signal is transmitted as the output image signal Vout. Further, when the third conversion method is selected, the 525i signal is transmitted as the output image signal Vout.

As described above, in the coefficient production circuit 136, coefficient data Wi of the estimated equation corresponding to the values of the position information h, v is produced per class using the coefficient seed data in each class loaded from the information memory bank 135 and the values of the position information h, v generated in the position information generation circuit 139. Then, the resultant coefficient data Wi is stored into the coefficient memory 134. Then, by use of the coefficient data Wi in each position information read out of the coefficient memory 134 in correspondence with the class code CL, the data y1 to yp of each pixel within the unit pixel block constituting the output image signal Vout is calculated in the estimated prediction calculation circuit 127. Consequently, this eliminates needs of a memory for storing a large amount of coefficient data when a format conversion into the 1080i signal or the XGA signal is performed, or a conversion into various image sizes is performed.

As described above, the coefficient seed data is stored per class in the information memory bank 135. This coefficient seed data is produced beforehand by learning.

First, an example of this production method will be described. The description will be made as to an example where coefficient seed data $w_{10}$ to $w_{n9}$, which is coefficient data in the production equation of the Equation (5), should be obtained.

Herein, the terms ti (i=0 to 9) are defined as following Equation (7), for the purpose of description:

$$t_0=1;\ t_1=v;\ t_2=h;\ t_3=v^2;\ t_4=vh;\ t_5=h^2;\ t_6=v^3;\ t_7=v^2h;\ t_8=vh^2;\ \text{and}\ t_9=h^3 \qquad (7)$$

By use of the Equation (7) above, the Equation (5) can be rewritten into Equation (8) as follows.

$$W_i = \sum_{j=0}^{9} w_{ij} t_i \qquad (8)$$

Finally, an undefined coefficient $w_{ij}$ is obtained by the leaning. Specifically, this is a solution method by use of a least square method where a coefficient value which minimizes a square error is defined per class using pixel data of a student signal and pixel data of a teacher signal. Defining the number of learning as m, a residual error at k-th learning data $(1 \leq k \leq m)$ as $e_k$, and a sum of square errors as E, E is expressed in following Equation (9) by use of the Equations (4) and (5).

$$\begin{aligned}
E &= \sum_{k=1}^{m} e_k^2 \\
&= \sum_{k=1}^{m} [y_k - (W_1 x_{1K} + W_2 x_{2K} + \ldots + W_n x_{nK})]^2 \\
&= \sum_{k=1}^{m} \{y_k - [(t_0 w_{10} + t_1 w_{11} + \ldots + t_9 w_{19}) x_{1k} + \ldots + \\
&\quad (t_0 w_{n0} + t_1 w_{n1} + \ldots + t_9 w_{n9}) x_{nk}]\}^2 \\
&= \sum_{k=1}^{m} \{y_k - [(w_{10} + w_{11} v + \ldots + w_{19} h^3) x_{1k} + \ldots + \\
&\quad (w_{n0} + w_{1n} v + \ldots + w_{n9} h^3) x_{nk}]\}^2
\end{aligned} \qquad (9)$$

Herein, the term $x_{ik}$ shows k-th pixel data at a position of i-th prediction tap of the student image, and the term $y_k$ shows k-th pixel data of the teacher image corresponding thereto.

In the solution method by use of the least square method, a value of $w_{ij}$ which makes the partial differentiation of the Equation (9) into 0 is obtained. This is expressed by Equation (10) as follows.

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \qquad (10)$$

Hereinafter, defining the terms $X_{ipjq}$ and $Y_{ip}$ as shown in following Equations (11) and (12), the Equation (10) can be rewritten into following Equation (13) by use of matrix.

$$X_{ipjq} = \sum_{k=1}^{m} x_{ik} t_p x_{jk} t_q \qquad (11)$$

$$Y_{ip} = \sum_{k=1}^{m} x_{ik} t_p y_k \qquad (12)$$

$$\begin{bmatrix} X_{1010} & X_{1011} & X_{1012} & \cdots & X_{1019} & X_{1020} & \cdots & X_{10n9} \\ X_{1110} & X_{1111} & X_{1112} & \cdots & X_{1119} & X_{1120} & \cdots & X_{11n9} \\ X_{1210} & X_{1211} & X_{1212} & \cdots & X_{1219} & X_{1220} & \cdots & X_{12n9} \\ \vdots & \vdots & \vdots & \ddots & \vdots & \vdots & \ddots & \vdots \\ X_{1910} & X_{1911} & X_{1912} & \cdots & X_{1919} & X_{1920} & \cdots & X_{19n9} \\ X_{2010} & X_{2011} & X_{2012} & \cdots & X_{2019} & X_{2020} & \cdots & X_{20n9} \\ \vdots & \vdots & \vdots & \ddots & \vdots & \vdots & \ddots & \vdots \\ X_{n910} & X_{n911} & X_{n912} & \cdots & X_{n919} & X_{n920} & \cdots & X_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \qquad (13)$$

This equation is generally referred to as a normal equation. The normal equation is solved about $w_{ij}$ by use of a sweeping method (Gauss-Jordan elimination method) and the like so that coefficient seed data can be calculated.

Figure 2:
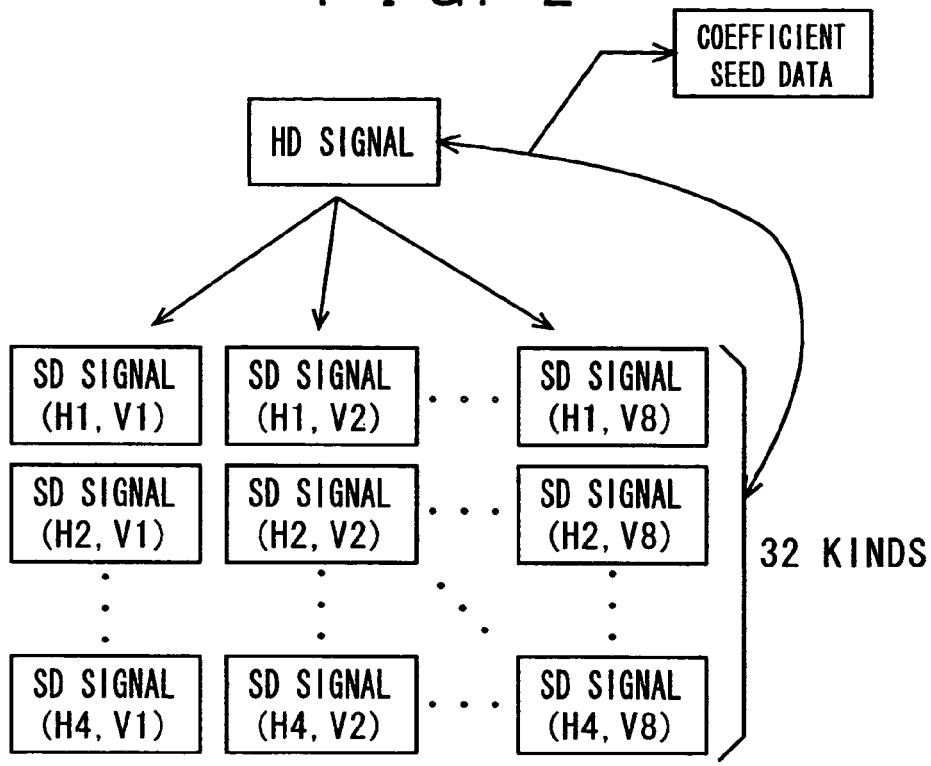
FIG. 2 is a diagram showing an example of a concept of a method for producing coefficient seed data.

FIG. 2 shows a concept of the aforementioned method for producing the coefficient seed data. An SD signal (525i signal) as a student signal is produced from a HD signal (1050i signal) as a teacher signal.

FIG. 3 shows a positional relationship of pixels between the 525i signal and the 1050i signal. Herein, large dots are pixels of the 525i signal, and small dots are pixels of the 1050i signal. Solid lines express the positions of pixels in odd fields, and broken lines express the positions of pixels in even fields.

Figure 4:
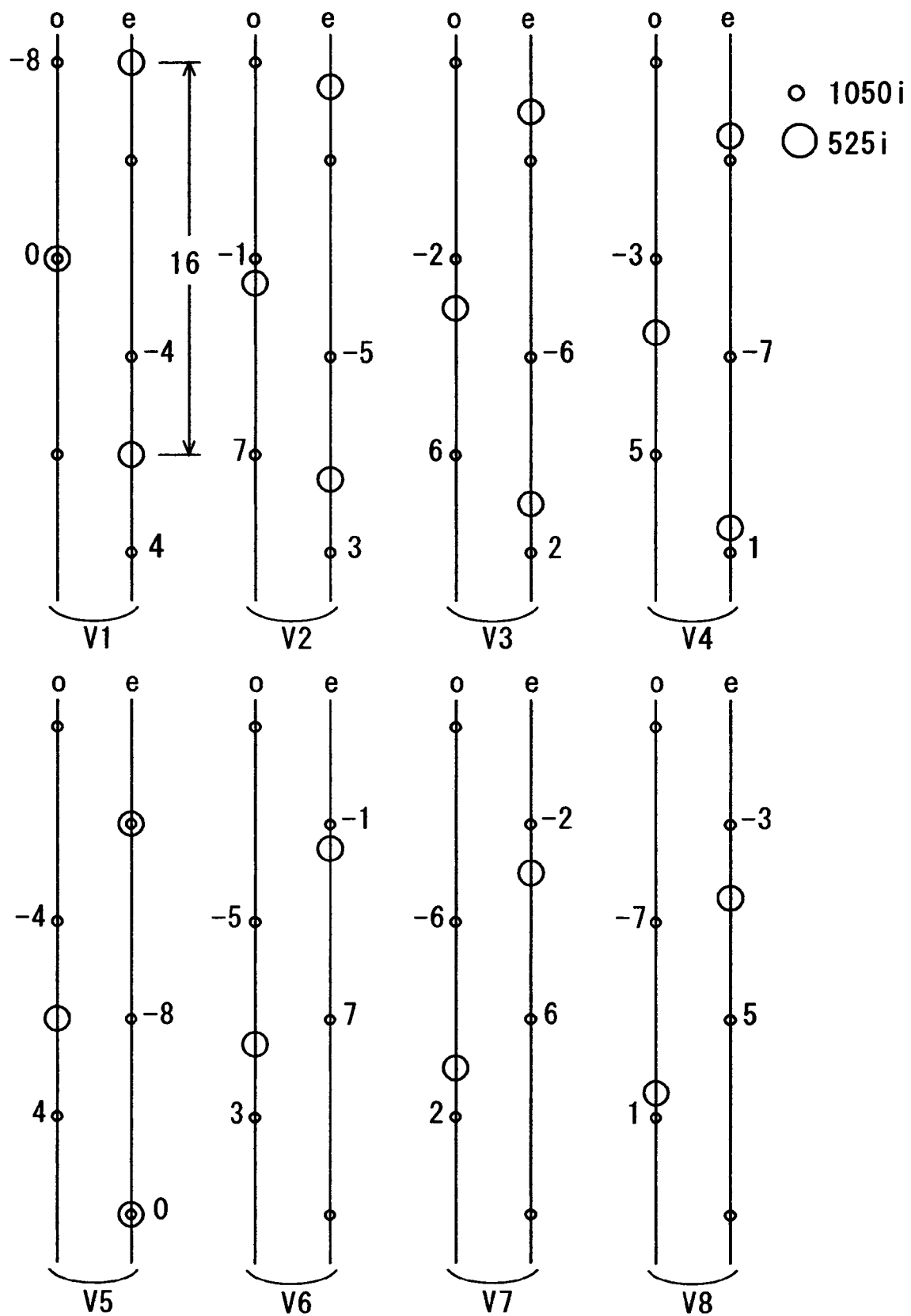
FIG. 4 is a diagram for illustrating a position shift in eight stages in a vertical direction.

The position of this SD signal is shifted into eight stages in a vertical direction, and is shifted into four stages in a horizontal direction so that 8×2=16 kinds of SD signals SD 1 to SD16 can be produced. FIG. 4 shows the states of position shifts V1 to V8 into eight stages in a vertical direction. Herein, the interval between pixels of the SD signal in the vertical direction is 16, and the downward direction is set to a positive direction. In addition, the term "o" expresses an odd field, and the term "e" expresses an even field.

In the state of V1, the shift amount of the SD signal is set to 0. In this case, the pixels of the HD signal come to have positions of 4, 0, −4, and −8 with respect to the pixels of the SD signal. In the state of V2, the shift amount of the SD signal is set to 1. In this case, the pixels of the HD signal come to have positions of 7, 3, −1, and −5 with respect to the pixels of the SD signal. In the state of V3, the shift amount of the SD signal is set to 2. In this case, the pixels of the HD signal come to have phases of 6, 2, −2, and −6 with respect to the pixels of the SD signal. In the state of V4, the shift amount of the SD signal is set to 3. In this case, the pixels of the HD signal come to have phase positions of 5, 1, −3, and −7 with respect to the pixels of the SD signal.

In the state of V5, the shift amount of the SD signal is set to 4. In this case, the pixels of the HD signal come to have positions of 4, 0, −4, and −8 with respect to the pixels of the SD signal. In the state of V6, the shift amount of the SD signal is set to 5. In this case, the pixels of the HD signal come to have positions of 7, 3, −1, and −5 with respect to the pixels of the SD signal. In the state of V7, the shift amount of the SD signal is set to 6. In this case, the pixels of the HD signal come to have positions of 6, 2, -2, and -6 with respect to the pixels of the SD signal. In the state of V8, the shift amount of the SD signal is set to 7. In this case, the pixels of the HD signal come to have phase positions of 5, 1, -3, and -7 with respect to the pixels of the SD signal.

Figure 5:
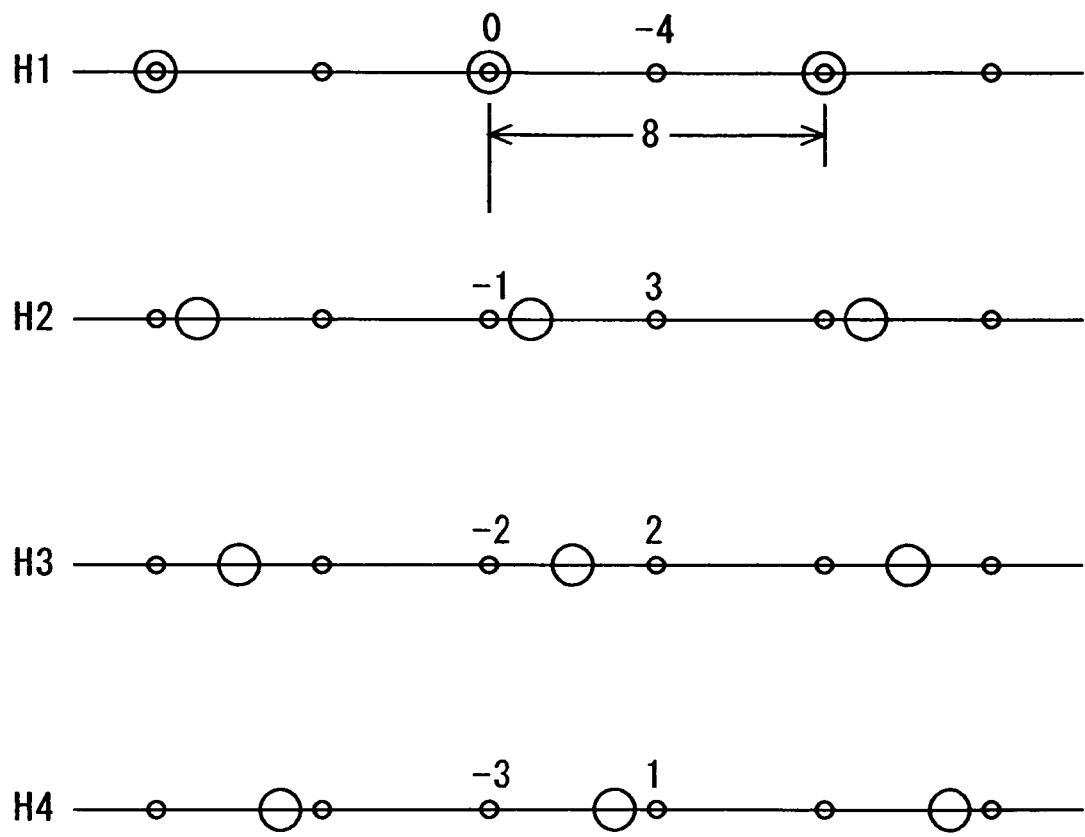
FIG. 5 is a diagram for illustrating position shift in four stages in a horizontal direction.

FIG. 5 shows the states of position shifts H1 to H4 into four stages in a horizontal direction. Herein, the interval between pixels of the SD signal in the horizontal direction is set to 8, and the right direction is set to a positive direction.

In the state of H1, the shift amount of the SD signal is set to 0. In this case, the pixels of the HD signal come to have positions of 0, and −4 with respect to the pixels of the SD signal. In the state of H2, the shift amount of the SD signal is set to 1. In this case, the pixels of the HD signal come to have 3, and −1 with respect to the pixels of the SD signal. In the state of H3, the shift amount of the SD signal is set to 2. In this case, the pixels of the HD signal come to have positions of 2, and −2 with respect to the pixels of the SD signal. In the state of H4, the shift amount of the SD signal is set to 3. In this case, the pixels of the HD signal come to have positions of 1, and −3 with respect to the pixels of the SD signal.

Figure 6:
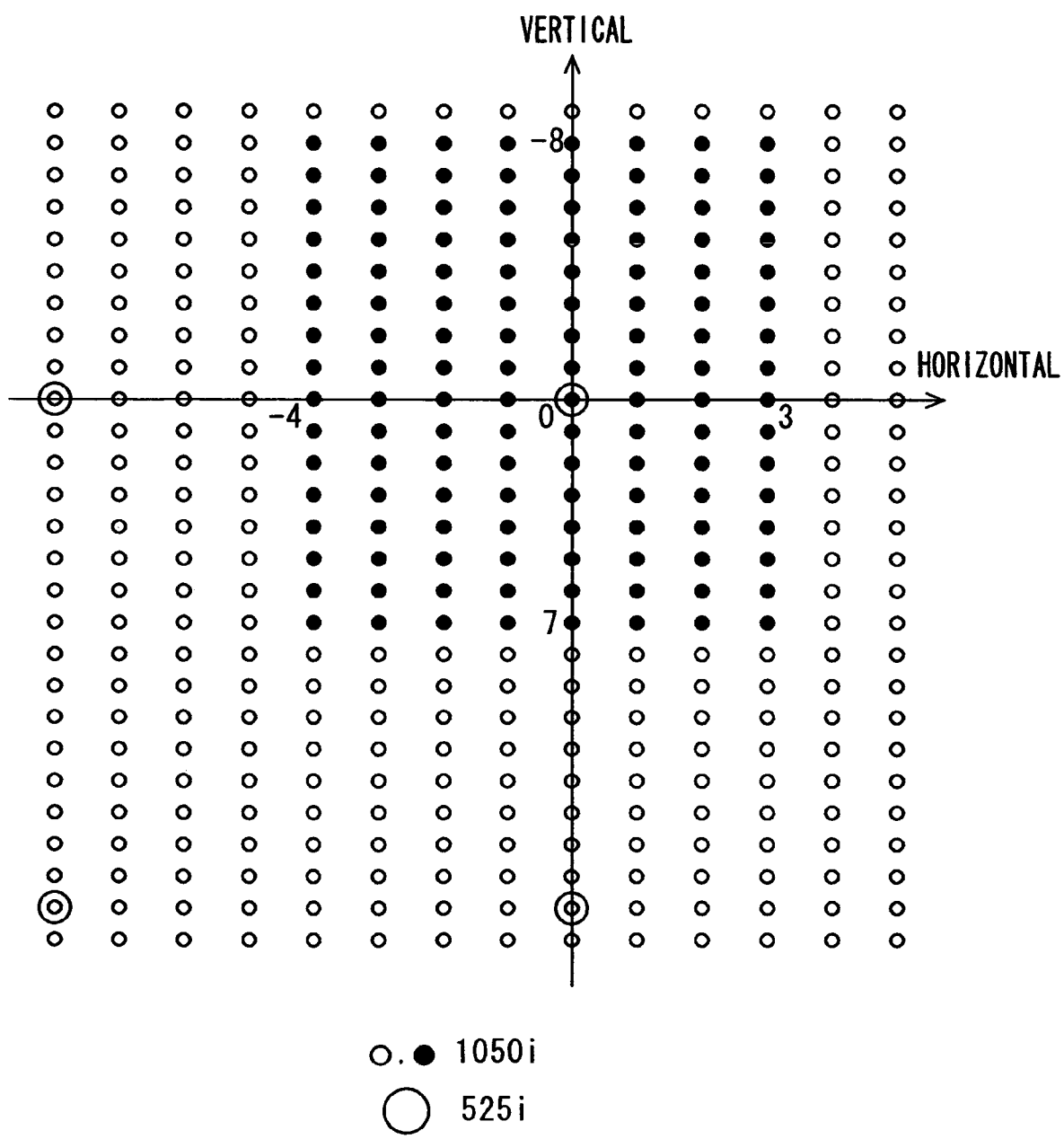
FIG. 6 is a diagram showing a phase position relationship between the SD signal (the 525i signal) and the HD signal (the 1050i signal)

FIG. 6 shows the positions of the pixels of the HD signal in a case where the pixels of the SD signal are located at center positions, as to 32 kinds of SD signals obtained as a result of shifting the position of the SD signal into 8 stages in the vertical direction and into 4 stages in the horizontal direction as described above. In other words, the pixels of the HD signal come to have positions expressed by• in FIG. 6 with respect to the pixels of the SD signal.

Returning back to FIG. 2, learning is performed between each of the SD signals in 32 kinds in total obtained as a result of shifting its position into 8 stages in the vertical direction and into 4 stages in the horizontal direction, and the HD signal, so that the coefficient seed data can be produced.

FIG. 7 shows a configuration of a coefficient seed data production device 150 for producing the coefficient seed data, based on the concept described above.

The coefficient seed data production device 150 includes an input terminal 151 for receiving the HD signal (1050i signal) as a teacher signal, an SD signal production circuit 152A for performing a thinning-out processing on the HD signal in horizontal and vertical directions so as to obtain the SD signal as an input signal, and a position shift circuit 152B for shifting the position of the SD signal into 8 stages in the vertical direction and into 4 stages in the horizontal direction so as to obtain the SD signals SD1 to SD32 in 32 kinds in total. The position shift circuit 152B receives parameters H, V for specifying the values of the position shifts in the vertical direction and in the horizontal direction. The position shift circuit 152B is constituted by, for example, a filter having a characteristic of sinx/x; however, it is also possible to employ another kind of filter which enables position shift. As an example of another kind of filter, there is a method where only a desired position is extracted from an over sampling filter, or the like.

The coefficient seed data production device 150 also includes first to third tap selection circuits 153 to 155 each for selectively extracting the data of a plurality of SD pixels located in periphery of the target position in the HD signal (1050i signal) from the SD signals SD1 to SD32 received from the position shift circuit 152B, and then transmits the extracted data.

These first to third tap selection circuits 153 to 155 are constituted so as to have the same structures as those of the first to third tap selection circuits 121 to 123 in the image signal processing section 110 described above. The taps selected in the fist to third tap selection circuits 153 to 155 are specified by the tap position information provided from a tap selection control section 156. In addition, the class information MV of the movement class output from a movement class detection circuit 158, which will be described later, is supplied to the tap selection control circuit 156. As a result of this, the tap position information to be supplied to the second tap selection circuit 154 is differed depending on whether a movement is large or small.

The coefficient seed data production apparatus 150 also includes a space class detection circuit 157 for detecting the distribution pattern of the levels of the space class tap data (SD pixel data) selectively extracted in the second tap selection circuit 154, detecting a space class based on the distribution pattern of levels, and then transmitting the class information thereof. The space class detection circuit 157 is constituted so as to have the same structure as that of the space class detection circuit 124 in the image signal processing section 110 described above. The space class detection circuit 157 transmits, as class information showing the space class, a re-quantized code qi for each SD pixel data as the space class tap data.

The coefficient seed data production apparatus 150 also includes the movement class detection circuit 158 for detecting a movement class mainly showing the degree of movement from the class tap data (SD pixel data) selectively extracted in the third tap selection circuit 155, and then transmitting the class information MV thereof. The movement class detection circuit 158 is constituted so as to have the same structure as that of the movement class detection circuit 125 in the image signal processing section 110 described above. In the movement class detection circuit 158, a differential between frames is calculated from the movement class tap data (SD pixel data) which is selectively extracted in the third tap selection circuit 155. Then, a threshold value processing is performed on an average value of the absolute values of differentials so that the movement class, which is an index of movement, can be detected.

The coefficient seed data production apparatus 150 also includes a class synthesis circuit 159 for obtaining a class code CL showing a class including the pixel data at the target position in the HD signal (1050i signal), based on the re-quantized code qi as class information about the space class received from the space class detection circuit 157 and the class information MV about the movement class received from the movement class detection circuit 158. The class synthesis circuit 159 is also constituted so as to have the same structure as that of the class synthesis circuit 126 in the image signal processing section 110 described above.

The coefficient seed data production apparatus 150 also includes a normal equation production section 160 for producing a normal equation (see the Equation (13)) to be employed for obtaining coefficient seed data w10 to wn9 for each class, from each HD pixel data y as pixel data at the target position obtained from the HD signal received at the input terminal 151, prediction tap data (SD pixel data) xi selectively extracted in the first tap selection circuit 153 respectively in correspondence with each HD pixel data y, and the class code CL received from the class synthesis circuit 159 respectively in correspondence with each HD pixel data y, and the parameters H, V of the position shift values in the vertical direction and in the horizontal direction.

In this case, learning data is produced in combination of one HD pixel data y and the prediction tap pixel data in the number of n corresponding to the HD pixel data y. The parameters H, V to be supplied to the position shift circuit 152B are sequentially changed so that 32 kinds of SD signals SD1 to SD32 having gradually-changed position shift values can be sequentially produced. As a result, a normal equation in which a large number of learning data are registered is produced in the normal equation production section 160. Thus, sequentially producing the SD signals SD1 to SD32 to register the learning data as described above allows the coefficient seed data for obtaining pixel data in an arbitrary position to be obtained.

Although not shown in the drawings, when disposing a delay circuit for time adjustment at a preceding stage of the first tap selection circuit 153, the timing of the SD pixel data xi supplied from the first tap selection circuit 153 to the normal equation production section 160 can be adjusted.

The coefficient seed data production apparatus 150 also includes a coefficient seed data decision section 161 for receiving data of the normal equation produced for each class in the normal equation production section 160, and solving the normal equation for each class so as to obtain the coefficient seed data $w_{10}$ to $w_{n9}$ in each class, and a coefficient seed memory 162 for storing thus-obtained coefficient seed data $w_{10}$ to $w_{n9}$. In the coefficient seed data decision section 161, the normal equation is solved according to a method such as sweeping so that the coefficient data $w_{10}$ to $w_{n9}$ can be obtained.

An operation of the coefficient seed data production apparatus 150 shown in FIG. 7 will be described. When the input terminal 151 receives an HD signal (1050i signal) as a teacher signal, the HD signal is subjected to the thinning-out processing in horizontal and vertical directions on the SD signal production circuit 152A so that an SD signal (525i signal) as a student signal can be produced. Thus-produced SD signal is supplied to the position shift circuit 152B, which shifts the position of the SD signal into 8 stages in the vertical direction and into 4 stages in the horizontal direction (see FIGS. 4 and 5), so that 32 kinds of SD signals $SD_1$ to $SD_{32}$ can be sequentially produced.

In the second tap selection circuit 154, space class tap data (SD pixel data) located in periphery of the target position in the HD signal is selectively extracted from these SD signals $SD_1$ to $SD_{32}$. In the second tap selection circuit 154, the selection of tap is performed, based on the tap position information supplied from the tap selection control circuit 156, the tap position information corresponding to the movement class detected in the movement class detection circuit 158.

The resultant space class tap data (SD pixel data) is supplied to the space class detection circuit 157. In the space class detection circuit 157, each SD pixel data as the space class tap data is subjected to ADRC processing so that a re-quantized code qi as class information of the space class (a class sort mainly for the purpose of expressing the waveform in a space) can be produced (see the Equation (1)).

In addition, in the third tap selection circuit 155, movement class tap data (SD pixel data) located in periphery of the target position in the HD signal is selectively extracted from the SD signals SD1 to SD32 obtained in the position shift circuit 152B. In this case, in the third tap selection circuit 155, the selection of the tap is performed, based on the tap position information supplied from the tap selection control circuit 156.

Thus-obtained movement class tap data (SD pixel data) is supplied to the movement class detection circuit 158. In the movement class detection circuit 158, the class information MV about the movement class (a class sort mainly for the purpose of expressing the degree of movement) is obtained from each SD pixel data as movement class tap data.

Thus-obtained movement information MV and the aforementioned re-quantized code qi are supplied to the class synthesis circuit 159. In the class synthesis circuit 159, the class code CL showing a class including pixel data at the target position in the HD signal is obtained from the movement information MV and the re-quantized code qi (see the Equation (3)).

Further, in the first tap selection circuit 153, the prediction tap data (SD pixel data) located in periphery of the target position in the HD signal is selectively extracted from the SD signals SD1 to SD32 produced in the position shift circuit 152B. In this case, in the first tap selection circuit 153, the selection of tap is performed, based on the tap position information supplied from the tap selection control circuit 156.

In the normal equation production section 160, a normal equation (see the Equation (13)) to be employed for obtaining coefficient the seed data w10 to w9 is produced for each class, from each HD pixel data y as pixel data at the target position obtained from the HD signal received at the input terminal 151, prediction tap data (SD pixel data) xi selectively extracted in the first tap selection circuit 153 respectively in correspondence with each HD pixel data y, the class code CL received from the class synthesis circuit 159 respectively in correspondence with each HD pixel data y, and the parameters H, V of the position shift values in the vertical direction and in the horizontal direction.

Then, the normal equation is solved in the coefficient seed data decision section 161 so that the coefficient seed data $w_{10}$ to $w_{n9}$ for each class can be obtained. The coefficient seed data $w_{10}$ to $w_{n9}$ is stored in the coefficient seed memory 162 in which addresses are assigned for each class.

As described above, in the coefficient seed data production device 150 shown in FIG. 7, it is possible to produce the coefficient seed data $w_{10}$ to $w_{n9}$ for each class stored in the information memory bank 135 of the image signal processing section 110 shown in FIG. 1.

Next, another example of a method for producing the coefficient seed data will be described. In the following example, the description will be made as to an example where coefficient seed data $w_{10}$ to $w_{n9}$, which is coefficient data in the production equation of the Equation (5), should be obtained.

Figure 8:
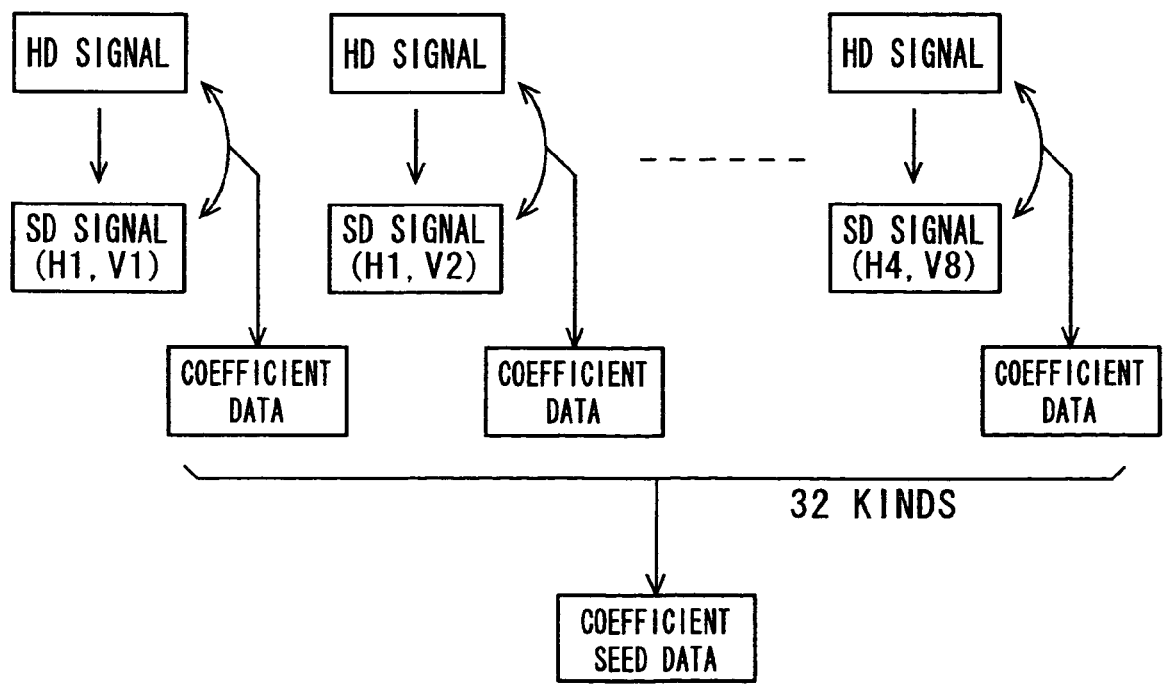
FIG. 8 is a diagram of another example of a concept of a method for producing coefficient seed data.

FIG. 8 shows a concept of this example. As is the case of the method for producing the coefficient seed data described above, the SD signal is shifted into 8 stages in the vertical direction and is shifted into 4 stages into the horizontal direction by the parameters H, V, so that 32 kinds of SD signals can be sequentially produced. Then, learning is performed between each SD signal and the HD signal so that coefficient data Wi of the estimated equation of the Equation (4) can be obtained. Then, coefficient seed data is produced using the coefficient data Wi produced in correspondence with each SD signal.

First, a method for obtaining the coefficient data of the estimated equation will be described. Herein, a description will be made as to a case where the coefficient data Wi (i=1 to n) of the estimated equation of the Equation (4) is obtained using a least square method. A consideration will be made on an observation equation of following Equation (14) as a generalized example, defining X as input data, W as a coefficient data, and Y as a predicted value.

$$XW = Y \quad (14)$$

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}, W = \begin{bmatrix} W_1 \\ W_2 \\ \cdots \\ W_n \end{bmatrix}, Y = \begin{bmatrix} y_1 \\ y_2 \\ \cdots \\ y_m \end{bmatrix}$$

In the Equation (14), m expresses the number of learning data, and n expresses the number of prediction taps.

A least square method is applied to the data collected by use of the observation equation of the Equation (14). Based on the observation equation of the Equation (14), a residual equation of following Equation (15) is considered.

$$XW = Y + E, E = \begin{bmatrix} e_1 \\ e_2 \\ \cdots \\ e_m \end{bmatrix} \quad (15)$$

From the residual equation of the Equation (15), it is considered that the most probable value of each Wi is established when the condition that minimizes the value of $e^2$ of following Equation (16) is satisfied. That is, the condition of following Equation (17) may be considered.

$$e^2 = \sum_{i=1}^{m} e_i^2 \quad (16)$$

$$e_1 \frac{\partial e_1}{\partial w_i} + e_2 \frac{\partial e_2}{\partial w_i} + \ldots + e_m \frac{\partial e_m}{\partial w_i} = 0 \ (i = 1, 2, \ldots, n) \quad (17)$$

Specifically, conditions in the number of n based on the value of i of the Equation (17) are considered, and $W_1, W_2, \ldots W_n$ having values satisfying these conditions may be obtained. As a result, following Equation (18) can be obtained from the residual equation of the Equation (15). Further, following Equation (19) can be also obtained from the Equations (18) and (14).

$$\frac{\partial e_i}{\partial w_1} = x_{i1}, \frac{\partial e_i}{\partial w_2} = x_{i2}, \ldots, \frac{\partial e_i}{\partial w_n} = x_{in} \ (i = 1, 2, \ldots, m) \quad (18)$$

$$\sum_{i=1}^{m} e_i x_{i1} = 0, \sum_{i=1}^{m} e_i x_{i2} = 0, \ldots, \sum_{i=1}^{m} e_i x_{in} = 0 \quad (19)$$

Then, a normal equation of following Equation (20) can be obtained from the Equations (15) and (19).

$$\begin{cases} \left(\sum_{j=1}^{m} x_{j1}x_{j1}\right)w_1 + \left(\sum_{j=1}^{m} x_{j1}x_{j2}\right)w_2 + \ldots + \left(\sum_{j=1}^{m} x_{j1}x_{jn}\right)w_n = \left(\sum_{j=1}^{m} x_{j1}y_j\right) \\ \left(\sum_{j=1}^{m} x_{j2}x_{j1}\right)w_1 + \left(\sum_{j=1}^{m} x_{j2}x_{j2}\right)w_2 + \ldots + \left(\sum_{j=1}^{m} x_{j2}x_{jn}\right)w_n = \left(\sum_{j=1}^{m} x_{j2}y_j\right) \\ \ldots \\ \left(\sum_{j=1}^{m} x_{jn}x_{j1}\right)w_1 + \left(\sum_{j=1}^{m} x_{jn}x_{j2}\right)w_2 + \ldots + \left(\sum_{j=1}^{m} x_{jn}x_{jn}\right)w_n = \left(\sum_{j=1}^{m} x_{jn}y_j\right) \end{cases} \quad (20)$$

Since the normal equation of the Equation (20) is capable of making equations in the same number as the unknown number n, the most probable value of each Wi can be obtained. In this case, simultaneous equations are solved by a method such as sweeping.

Next, a method for obtaining the coefficient seed data using the coefficient data produced in correspondence with each SD signal will be described.

It is assumed that coefficient data in a certain class, obtained as a result of learning performed by use of the SD signal corresponding to the parameters H, V, is resulted into $k_{vhi}$. Herein, the term i expresses the prediction tap number. Coefficient seed data of this class is obtained from the $k_{vhi}$.

Each coefficient data Wi (i=1 to n) is expressed in the Equation (5) described above using the coefficient seed data $w_{10}$ to $w_{n9}$. Herein, under the consideration that a least square method is employed for the coefficient data Wi, a residual is expressed by following Equation (21).

$$e_{vhi} = k_{vhi} - (w_{i0} + w_{i1}v + w_{i2}h + w_{i3}v^2 + w_{i4}vh + \\ w_{i5}h^2 + w_{i6}v^3 + w_{i7}v^2h + w_{i8}vh^2 + w_{i9}h^3) \\ = k_{vhi} - \sum_{j=0}^{9} w_{ij}t_j$$ (21)

Herein, the term $t_j$ has been expressed in the Equation (7) described above. When a least square method is employed in the Equation (21), following Equation (22) can be obtained.

$$\frac{\partial}{\partial w_{ij}} = \sum_v \sum_h (e_{vhi})^2 = \sum_v \sum_h 2\left(\frac{\partial e_{vhi}}{\partial w_{ij}}\right)e_{vhi} \\ = -\sum_v \sum_h 2t_j e_{vhi} \\ = 0$$ (22)

Herein, defining the terms $X_{jk}, Y_j$ as following Equations (23) and (24) respectively, Equation (22) can be rewritten into following Equation (25).

$$X_{jk} = \sum_v \sum_h t_j t_k$$ (23)

$$Y_j = \sum_v \sum_h t_j k_{vhi}$$ (24)

Equation (25)

$$\begin{bmatrix} X_{00} & X_{01} & \cdots & X_{09} \\ X_{10} & X_{11} & \cdots & X_{19} \\ \vdots & \vdots & \ddots & \vdots \\ X_{90} & X_{91} & \cdots & X_{99} \end{bmatrix} \begin{bmatrix} w_{10} \\ w_{11} \\ \vdots \\ w_{19} \end{bmatrix} = \begin{bmatrix} Y_0 \\ Y_1 \\ \vdots \\ Y_9 \end{bmatrix}$$ (25)

This Equation (25) is also a normal equation. By solving the Equation (25) according to a general solution such as a sweeping method, the coefficient seed data $w_{10}$ to $w_{n9}$ can be obtained.

FIG. 9 shows a configuration of a coefficient seed data production device 150' for producing the coefficient seed data according to the concept shown in FIG. 8. In FIG. 9, constituent elements corresponding to those of FIG. 7 are denoted by the same reference numerals, and detailed descriptions thereof will be omitted.

The coefficient seed data production apparatus 150' includes a normal equation production section 171 for producing a normal equation (see the Equation (20)) to be employed for obtaining coefficient data Wi (i=1 to n) for each class, from each HD pixel data y as target pixel data obtained from the HD signal received at the input terminal 151, prediction tap data (SD pixel data) xi selectively extracted in the first tap selection circuit 153 respectively in correspondence with each HD pixel data y, and the class code CL received from the class synthesis circuit 159 respectively in correspondence with each HD pixel data y.

In this case, learning data is produced in combination of one HD pixel data y and the prediction tap pixel data in the number of n corresponding to the HD pixel data y. The parameters H, V to be supplied to the position shift circuit 152B are sequentially changed so that 32 kinds of SD signal SD1 to SD32 can be sequentially produced, thus producing learning data between the HD signal and each SD signal respectively. As a result, in the normal equation production section 171, a normal equation for obtaining coefficient data Wi (i=1 to n) is produced for each class in correspondence with each SD signal.

The coefficient seed data production apparatus 150' also includes a coefficient data decision section 172 for receiving data of the normal equation produced in the normal equation production section 171, and solving the normal equation so as to obtain coefficient data Wi for each class respectively corresponding to each SD signal, and a normal equation production section 173 for producing a normal equation (see the Equation (25)) for obtaining coefficient seed data w10 to wn9 for each class using the coefficient data Wi for each class respectively corresponding to each SD signal and the parameters H, V of the position shift values in the vertical direction and in the horizontal direction.

The coefficient seed data production apparatus 150' also includes a coefficient seed data decision section 174 for receiving data of the normal equation produced for each class in the normal equation production section 173 and the parameters H, V of the phase shift values in the vertical direction and in the horizontal direction, and solving the normal equation for each class so as to obtain coefficient seed data $w_{10}$ to $w_{n9}$ in each class, and a coefficient seed memory 162 for storing thus-obtained coefficient seed data $w_{10}$ to $w_{n9}$.

The remaining constituent elements of the coefficient seed data production device 150' shown in FIG. 9 have the same configuration as that of the coefficient seed data production device 150 shown in FIG. 7.

An operation of the coefficient seed data production apparatus 150' shown in FIG. 9 will be described. An HD signal (1050i signal) is supplied to the input terminal 151 as a teacher signal. Then, the HD signal is subjected to the thinning-out processing in the horizontal and vertical directions in the SD signal production circuit 152A so that an SD signal (525i signal) as a student signal can be obtained. Thus-produced SD signal is supplied to the position shift circuit 152B where the position of the SD signal is shifted into 8 stages in the vertical direction and is shifted into 4 stages in the horizontal direction (see FIGS. 4 and 5), so that 32 kinds of SD signals SD1 to SD32 are sequentially produced.

In the second tap selection circuit 154, space class tap data (SD pixel data) located in periphery of the target position in the HD signal (1050i signal) is selectively extracted from these SD signals $SD_1$ to $SD_{32}$. In the second tap selection circuit 154, the selection of tap is performed, based on the tap position information supplied from the tap selection control circuit 156, the tap position information corresponding to the movement class detected in the movement class detection circuit 158.

The resultant space class tap data (SD pixel data) is supplied to the space class detection circuit 157. In the space class detection circuit 157, each SD pixel data as the space class tap data is subjected to ADRC processing so that a re-quantized code qi as class information of the space class (a class sort mainly for the purpose of expressing the waveform in a space) can be obtained (see the Equation (1)).

In addition, in the third tap selection circuit 155, movement class tap data (SD image data) located in periphery of the target position in the HD signal is selectively extracted from the SD signals SD1 to SD32 obtained in the position shift circuit 152B. In this case, in the third tap selection circuit 155, the selection of the tap is performed, based on the tap position information supplied from the tap selection control circuit 156.

Thus-obtained movement class tap data (SD pixel data) is supplied to the movement class detection circuit 158. In the movement class detection circuit 158, class information MV about a movement class (a class sort mainly for the purpose of expressing the degree of movement) is obtained from each SD pixel data as movement class tap data.

Thus-obtained movement information MV and the aforementioned re-quantized code qi are supplied to the class synthesis circuit 159. In the class synthesis circuit 159, a class code CL showing a class including pixel data at the target position in the HD signal is obtained from the movement information MV and the re-quantized code qi (see the Equation (3)).

Further, in the first tap selection circuit 153, the prediction tap data (SD pixel data) located in periphery of the target position in the HD signal is selectively extracted from the SD signals SD1 to SD32 produced in the position shift circuit 152B. In this case, in the first tap selection circuit 153, the selection of tap is performed, based on the tap position information supplied from the tap selection control circuit 156.

In the normal equation production section 171, a normal equation (see the Equation (20)) to be employed for obtaining the coefficient data Wi (i=1 to n) is produced for each class respectively in correspondence with each SD signal produced in the SD signal production circuit 152, from each HD pixel data y as pixel data at the target position obtained from the HD signal received at the input terminal 151, prediction tap data (SD pixel data) xi selectively extracted in the first tap selection circuit 153 respectively in correspondence with each HD pixel data y, and the class code CL receiving from the class synthesis circuit 159 respectively in correspondence with each HD pixel data y.

Then, the normal equation is solved in the coefficient data decision section 172 so that coefficient data Wi for each class respectively corresponding to each DS signal can be obtained. In the normal equation production section 173, a normal equation (see the Equation (25)) employed for obtaining coefficient seed data W10 to wn9 is produced for each class, from the coefficient data Wi for each class respectively corresponding to each SD signal and the parameters H, V of the position shift values in the vertical direction and in the horizontal direction.

Then, the normal equation is solved in the coefficient seed data decision section 174 so that coefficient seed data $w_{10}$ to $w_{n9}$ for each class can be obtained. The coefficient seed data $w_{10}$ to $w_{n9}$ is stored in the coefficient seed memory 162 in which addresses are assigned for each class.

As described above, in the coefficient seed data production device 150' shown in FIG. 9 as well, it is possible to produce the coefficient seed data $w_{10}$ to $W_{n9}$ for each class stored in the information memory bank 135 of the image signal processing section 110 shown in FIG. 1.

In the image signal processing section 110 shown in FIG. 1, the production equation of the Equation (5) has been employed for producing the coefficient data Wi (i=1 to n). Alternatively, it is also possible to employ following Equation (26) or (27). Further alternatively, the coefficient data Wi also can be produced by employing a polynomial equation of different degrees or an equation expressed by another function.

$$W_1 = w_{10} + w_{11}v + w_{12}h + w_{13}v^2 + w_{14}h^2 + w_{15}v^3 + w_{16}h^3 \quad (26)$$
$$W_2 = w_{20} + w_{21}v + w_{22}h + w_{23}v^2 + w_{24}h^2 + w_{25}v^3 + w_{26}h^3$$
$$\vdots$$
$$W_i = w_{i0} + w_{i1}v + w_{i2}h + w_{i3}v^2 + w_{i4}h^2 + w_{i5}v^3 + w_{i6}h^3$$
$$\vdots$$
$$W_n = w_{n0} + w_{n1}v + w_{n2}h + w_{n3}v^2 + w_{n4}h^2 + w_{n5}v^3 + w_{n6}h^3$$

$$W_1 = w_{10} + w_{11}v + w_{12}h + w_{13}v^2 + w_{14}vh + w_{15}h^2 \quad (27)$$
$$W_2 = w_{20} + w_{21}v + w_{22}h + w_{23}v^2 + w_{24}vh + w_{25}h^2$$
$$\vdots$$
$$W_i = w_{i0} + w_{i1}v + w_{i2}h + w_{i3}v^2 + w_{i4}vh + w_{i5}h^2$$
$$\vdots$$
$$W_n = w_{n0} + w_{n1}v + w_{n2}h + w_{n3}v^2 + w_{n4}vh + w_{n5}h^2$$

Figure 10:
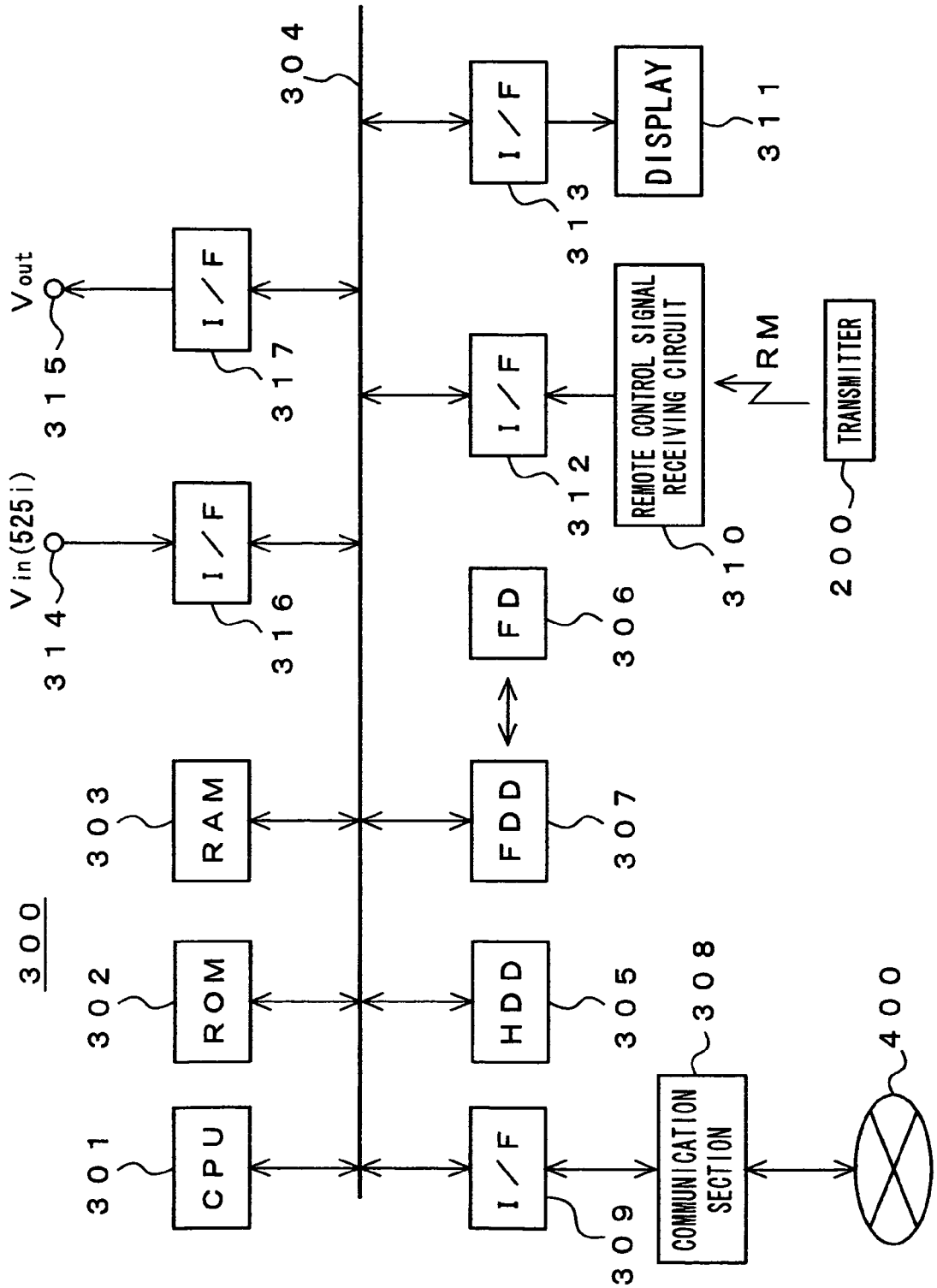
FIG. 10 is a block diagram showing an exemplary structure of an image signal processor to be implemented in software.

In addition, the processing performed in the image signal processing section 110 can be implemented in software, by use of an image signal processor such as the image signal processor 300 as shown in FIG. 10.

First, the image signal processor 300 shown in FIG. 10 will be described. The image signal processor 300 comprises a CPU 301 for controlling operations of the entire apparatus, a ROM (Read Only Memory) 302 for storing an operation program for the CPU 301, coefficient seed data, and the like, and a RAM (Random Access Memory) 303 for organizing a working area for the CPU 301. The CPU 301, ROM 302 and RAM 303 are connected to a bus 304, respectively.

The image signal processor 300 also comprises a hard disc drive (HDD) 305 as an external storage apparatus, and a disc drive (FDD) 307 for driving a Floppy (Trade Name) disc 306. These drives 305, 307 are connected to the bus 304, respectively.

The image signal processor 300 also comprises a communication section 308 for connecting to a communication network 400 such as the Internet through wired transmission or radio transmission. The communication section 308 is connected to the bus 304 via an interface 309.

The image signal processor 300 also comprises a user interface section. The user interface section includes a remote control signal receiving circuit 310 for receiving a remote control signal RM from a remote control transmitter 200, and a display 311 constituted by a liquid crystal display (LCD) and the like. The receiving circuit 310 is connected to the bus 304 via an interface 312, and similarly, the display 311 is connected to the bus 304 via the interface 313.

The image signal processor 300 also comprises an input terminal 314 for receiving a 525i signal as an input image signal Vin, and an output terminal 315 for transmitting an output image signal Vout. The input terminal 314 is connected to the bus 304 via an interface 316, and similarly, the output terminal 315 is connected to the bus 304 via an interface 317.

The processing program, the coefficient seed data and the like may be, instead of being stored into the ROM 302 beforehand as described above, downloaded from the communication network 400 such as the Internet via the communication section 308 so as to be stored into the hard disc or the RAM 303, and then be used. Further, the processing program, the coefficient seed data and the like may be provided in the state of being stored in the Floppy (Trade Name) disc 306.

Further, the 525i signal as the input image signal Vin may be, instead of being received through the input terminal 314, recorded in a hard disc beforehand, or may be downloaded from the communication network 400 such as the Internet via the communication section 308. In addition, the output image signal Vout may be, instead of or at the same time of being transmitted through the output terminal 315, supplied to the display 311 so as to display an image. Alternatively, the output image signal Vout signal may be stored in a hard disc, or may be transmitted to the communication network 400 such as the Internet via the communication section 308.

Referring to a flow chart of FIG. 11, a processing procedure for obtaining the output image signal Vout from an input image signal Vin in the image signal processor 300 shown in FIG. 10 will be described.

First, a processing starts in Step ST1. Then, in Step ST2, input image signals Vin are input in the unit of frame or in the unit of field. If the input image signals Vin are input through the input terminal 314, the RAM 303 temporarily stores the pixel data constituting the input image signal Vin. If the input image signals Vin are recorded on the hard disc, the input image signal Vin is read out of the hard disc drive 307 and then the RAM 303 temporarily stores the pixel data constituting the input image signal Vin. Then, in Step ST3, it is judged whether or not the processing of the input image signal Vin is finished for all frames or all fields. If the processing is finished, then the processing finishes in Step ST4. Contrarily, if the processing has not yet finished, then the procedure goes to Step ST5.

In Step ST5, position information h, v about each pixel within the unit pixel block constituting the output image signal Vout is generated using the value of n/m in compliance with the conversion method (including the magnification of an image to be displayed) selected by the user through operating the remote control transmitter 200. Then, in Step ST6, coefficient data Wi of the estimated equation (see the Equation (4)) for each class is produced corresponding to each pixel within the unit pixel block according to the production equation (for example, the Equation (5)) using the position information h, v about each pixel within the unit pixel block and the coefficient seed data for each class.

Next, in Step ST7, class tap data and prediction tap pixel data are obtained from the pixel data of the input image signal Vin input in Step ST2, in correspondence with each pixel data within the unit pixel block constituting the output image signal Vout to be produced. Then, in Step ST8, it is judged whether or not the processing for obtaining the pixel data of the output image signal Vout finishes in all the areas of the input pixel data of the input image signal Vin. If the processing finishes, then the procedure returns to the Step ST2 where the procedure goes to a processing of inputting input image signal Vin in the next frame or field. Contrarily, if the processing has not yet finished, then the procedure goes to Step ST9.

In Step ST9, a class code CL is produced from the pixel data of the class tap obtained in Step ST7. Then, in Step ST10, data of each pixel within the unit pixel block constituting the output image signal Vout is produced according to the estimated equation using the coefficient data corresponding to the produced class code CL and the SD pixel data of the prediction tap. After that, the procedure returns to the Step ST7 where the same processing as described above is repeated.

Figure 11:
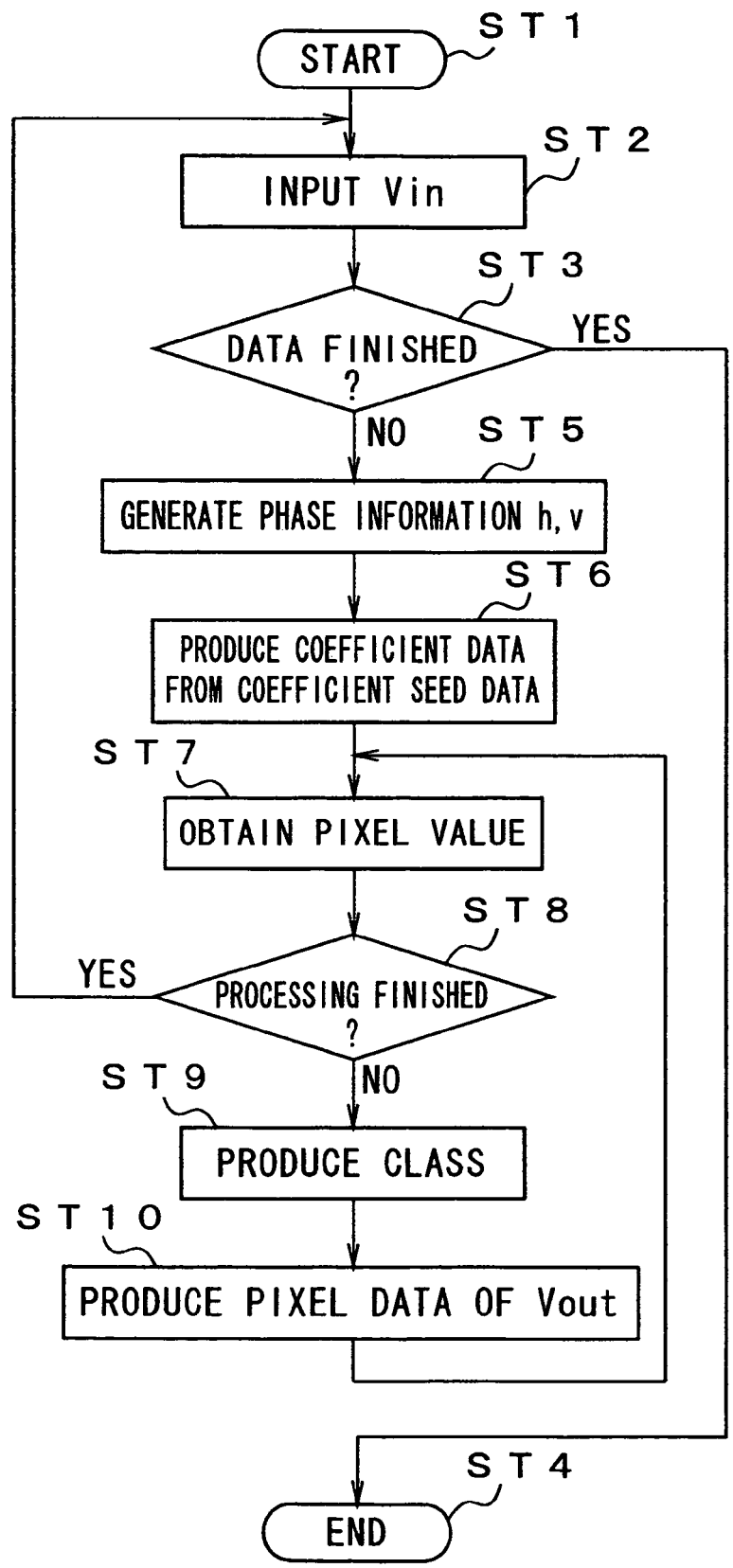
FIG. 11 is a flow chart showing a procedure of processing an image signal.

In the manner as described above, the pixel data of the input image signal Vin which has been input is processed by performing the processing in accordance with the flow chart shown in FIG. 11 so that the pixel data of the output image signal Vout can be obtained. As described above, the output image signal Vout obtained as a result of the processing is transmitted to the output terminal 315, or is supplied to the display 311 to display an image produced thereby. Alternatively, the output image signal Vout is supplied to the hard disc drive 305 to be recorded on the hard disc.

In addition, the processing in the coefficient seed data production device 150 shown in FIG. 7 can be implemented in software, although an illustration of the processing device thereof is omitted from the drawings.

Referring to the flow chart of FIG. 12, a processing procedure for producing coefficient seed data will be described.

First, a processing starts in Step ST21. Then, in Step ST22, position shift values (for example, specified by parameters H, V) of the SD signal to be used for learning are selected. Then, in Step ST23, it is judged whether or not the learning has been completed for all the position shift values. If the learning has not yet completed for all the position shift values, then the procedure goes to Step ST24.

In the Step ST24, already-known HD pixel data is input in the unit of frame or field. Then, in Step ST25, it is judged whether or not the processing has been completed for all the HD pixel data. If the processing is completed, then the procedure returns to the Step ST22 wherein the next position shift value is selected and the same processing as described above is repeated. Contrarily, if the processing has not yet completed, then the procedure goes to Step ST26.

In Step ST26, SD pixel data having a phase position shifted by the position shift value selected in the Step ST22 is produced from the HD pixel data which have been input in the Step ST24. Then, in Step ST27, pixel data of class tap and pixel data of prediction tap are obtained from the SD pixel data produced in the Step ST26, in correspondence with each HD pixel data input in the Step ST24. Then, in Step ST28, it is judged whether or not the learning has been completed for all the areas in the produced SD pixel data. If the learning is completed, then the procedure returns to the Step ST24 wherein the next HD pixel data is input and the same processing as described above is repeated. Contrarily, if the learning has not yet completed, then the procedure goes to Step ST29.

In the Step ST29, a class code CL is produced from the SD pixel data of the class tap obtained in the Step ST27. Then, in Step ST30, a normal equation (see the Equation (13)) is produced. After that, the procedure returns to the Step ST27.

If the learning is completed for all the position shift values in the Step ST23, then the procedure goes to Step ST31. In the Step ST31, the normal equation is solved by a method such as sweeping so that the coefficient seed data for each class can be obtained. Then, in Step ST32, thus-obtained coefficient seed data is stored in the memory. After that, the processing finishes in Step ST33.

Figure 12:
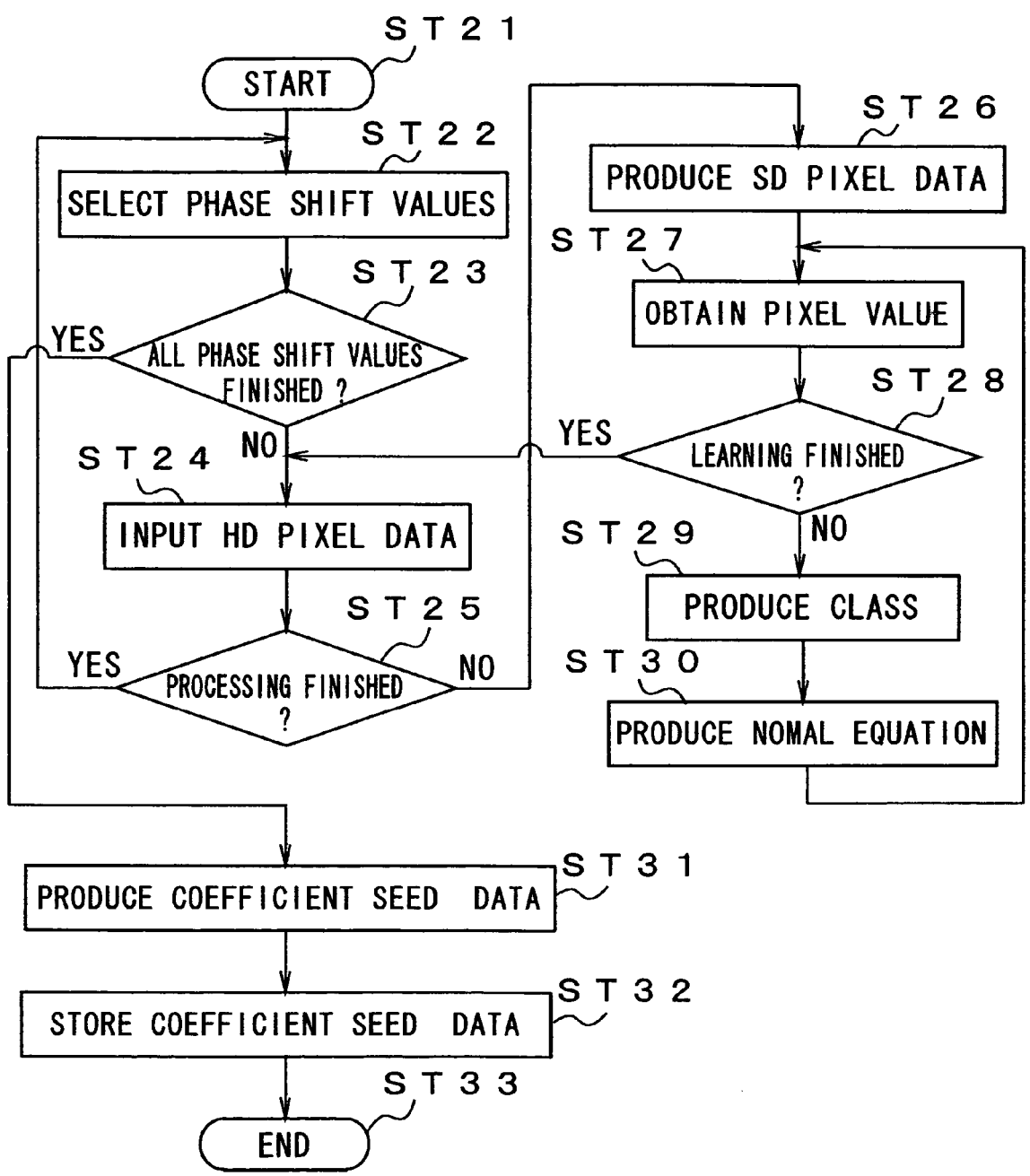
FIG. 12 is a flow chart showing a processing of producing coefficient seed data (No. 1)

As described above, the coefficient seed data for each class can be obtained in the same procedure as that employed in the coefficient seed data production device 150 shown in FIG. 7, through the processing along the flow chart shown in FIG. 12.

In addition, the processing in the coefficient seed data production device 150' shown in FIG. 9 can be also implemented in software, although an illustration of the processing device thereof is omitted from the drawings.

Referring to the flow chart of FIG. 13, a processing procedure for producing coefficient seed data will be described.

First, a processing starts in Step ST41. Then, in Step ST42, position shift values (for example, specified by parameters H, V) of the SD signal to be used for learning are selected. Then, in Step ST43, it is judged whether or not a calculation processing for coefficient data has been finished for all the position shift values. If it has not yet finished, then the procedure goes to Step ST44.

In the Step ST44, already-known HD pixel data is input in the unit of frame or field. Then, in Step ST45, it is judged whether or not the processing has been completed for all the HD pixel data. If the processing has not yet completed, the procedure goes to Step ST46 wherein SD pixel data having a position shifted by the position shift value selected in the Step ST42 is produced from the HD pixel data which have been input in the Step ST44.

Then, in Step ST47, pixel data of class tap and pixel data of prediction tap are obtained from the SD pixel data produced in the Step ST46, in correspondence with each HD pixel data input in the Step ST44. Then, in Step ST48, it is judged whether or not the learning has been completed for all the areas in the produced SD pixel data. If the learning is completed, then the procedure returns to the Step ST44 wherein the next HD pixel data is input and the same processing as described above is repeated. Contrarily, if the learning has not yet completed, then the procedure goes to Step ST49.

In the Step ST49, a class code CL is produced from the SD pixel data of the class tap obtained in the Step ST47. Then, in Step ST50, a normal equation (see the Equation (20)) is produced to be used for obtaining coefficient data. After that, the procedure returns to the Step ST47.

If the processing is completed for all the HD pixel data in the Step ST45 described above, then the normal equation produced in the Step ST50 is solved by a method such as sweeping in Step ST51 wherein the coefficient data for each class can be obtained. After that, the procedure returns to the Step ST42 wherein the next position shift value is selected and the same processing as described above is repeated so that coefficient data corresponding to the next position shift value for each class can be obtained.

If the coefficient data has been obtained for all the position shift values in the Step ST43 described above, then the procedure goes to Step ST52. In the Step ST52, a normal equation (see the Equation (25)) employed for obtaining coefficient seed data is produced from the coefficient data with respect to all the position shift values.

Then, in Step ST 53, the normal equation produced in the Step ST52 is solved by a method such as sweeping so that the coefficient seed data for each class can be obtained. Then, in Step ST54, thus-obtained coefficient seed data is stored in the memory. After that, the processing finishes in Step ST55.

Figure 13:
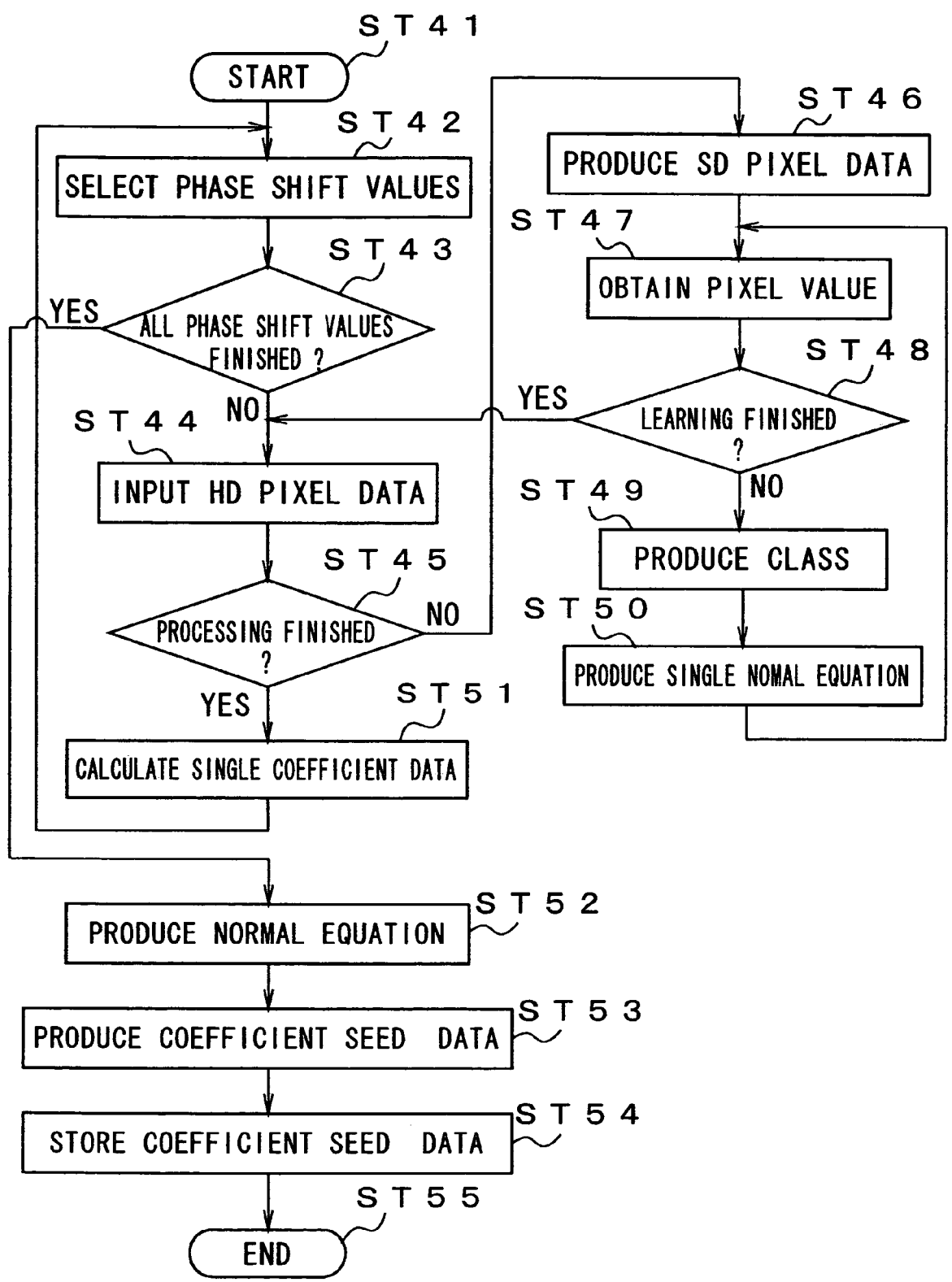
FIG. 13 is a flow chart showing a processing of producing coefficient seed data (No. 2)

As described above, the coefficient seed data for each class can be obtained in the same procedure as that employed in the coefficient seed data production device 150' shown in FIG. 9, through the processing along the flow chart shown in FIG. 13.

Although, in the embodiments described above, a linear equation is employed as the estimated equation for producing the HD signal, the present invention is not limited thereto. Alternatively, a high order polynomial equation may be employed as the estimated equation.

Further, in the embodiments described above, the class code CL is detected, and the coefficient data Wi corresponding to the detected class code is used in the estimated prediction calculation. However, it is also conceivable to omit the detected portion of the class code CL. In this case, only one kind of coefficient seed data is stored in the information memory bank 135.

Further, although, in the embodiments described above, the output image signal Vout transmitted from the image signal processing section 110 is supplied to the display section 11 wherein an image created by the output image signal Vout is displayed, the output image signal Vout may be supplied into a recording device such as a video tape recorder which records it. In this case, the output image signal Vout may be processed in the post-processing circuit 129 in such a manner as to have a data structure optimum for recording.

Further, in the embodiments described above, the 525i signal as the input image signal Vin is converted into the 1080i signal, the XGA signal, or the 525i signal for obtaining an image to be displayed in a different magnification, as the output image signal Vout. However, the present invention is not limited thereto. It is a matter of course that the preset invention is similarly applicable to another cases where a first image signal is converted into a second image signal using an estimated equation.

Further, although the embodiments described above have showed the example where the information signal is an image signal, the present invention is not limited thereto. For example, the present invention is also applicable to a case where the information signal is a sound signal.

According to the present invention, when a first information signal is to be converted into a second information signal, phase information about a target position in the second information signal is obtained from the information about format or size conversion; coefficient data of an estimated equation is produced from coefficient seed data, based on the resultant phase information; and information data of the target position in the second information signal is obtained using thus-produced coefficient data. As a result, it becomes possible to eliminate a necessity of a memory for storing a large amount of coefficient data at the time of making conversions into various formats and sizes, and the apparatus can be structured at low cost.

Further, according to the present invention, the sum of the coefficient data of the estimated equation produced using the coefficient seed data is obtained, and then the information data of the target position produced by use of the estimated equation is normalized with dividing it by thus-obtained sum. As a result, it becomes possible to remove the fluctuations in the levels of the information data of the target position caused by a rounding error occurred when the coefficient data of the estimated equation is obtained according to the production equation using the coefficient seed data.

INDUSTRIAL APPLICABILITY

As described above, the information signal processor, the method for processing the information signal, the image signal processor and the image display apparatus using the same, the device for producing the coefficient seed data used for the same and its production method, and an information-providing medium according to the present invention are preferable for use in the case of converting a format such as a case where the 525i signal is converted into the 1080i signal, a case where the 525i signal is converted into the XGA signal and the like, or converting an image size.

What is claimed is:

1. A coefficient seed data production device for producing coefficient seed data, said coefficient seed data being coefficient data in a production equation for producing coefficient data to be used in an estimated equation employed for converting a first information signal including a first plurality of information data into a second information signal including a second plurality of information data, said production equation using positional information as a parameter, comprising:

signal processing means for performing a conversion processing on a teacher signal to obtain a student signal;

positional shift means for shifting a position of said student signal with a position of said teacher signal, the information data position of said teacher signal being gradually changed with respect to said information data position of said student signal;

first data selection means for selecting a plurality of first information data located in a periphery of a target position in said teacher signal, based on said student signal having a position shifted by said positional shift means;

normal equation production means for producing a normal equation for obtaining said coefficient seed data using the selected plurality of said first information data and the information data at said target position in said teacher signal; and coefficient seed data calculation means for solving said normal equation to obtain said coefficient seed data.

2. The coefficient seed data production device according to claim 1, further comprising:

second data selection means for selecting a plurality of second information data located in a periphery of a target position in said teacher signal, based on said student signal having a position shifted by said positional shift means; and class detection means for detecting a class at said target position, based on said plurality of second information data selected in said second data selection means, wherein said normal equation production means produces the normal equation for obtaining said coefficient seed data for each class using the class detected by the class detection means, the plurality of said first information data selected in said first data selection means, and said information data at said target position in said teacher signal, and wherein said coefficient seed data calculation means solves the normal equation of each class to obtain the coefficient seed data for each class.

3. A method for producing coefficient seed data, said coefficient seed data being used as coefficient data in a production equation for producing coefficient data to be used in an estimated equation employed for converting a first information signal including a first plurality of information data into a second information signal including a second plurality of information data, said production equation using positional information as a parameter, comprising:

a first step of performing a conversion processing on a teacher signal to obtain a student signal;

a second step of shifting a position of said student signal with a position of said teacher signal, the information data position of said teacher signal being gradually changed with respect to the information data position of said student signal;

a third step of selecting a plurality of information data located in a periphery of a target position in said teacher signal, based on said student signal having a position shifted in said second step;

a fourth step of producing a normal equation for obtaining said coefficient seed data using the plurality of said information data selected in the third step and the information data at said target position in said teacher signal; and a fifth step of solving the normal equation produced in the fourth step to obtain said coefficient seed data.

4. An information-providing medium for providing a computer program for, in order to produce coefficient seed data for use in a production equation that is used to produce coefficient for use in an estimated equation employed for converting a first information signal including a first plurality of information data into a second information signal including a second plurality of information data, said production equation using positional information as a parameter, and said coefficient seed data being used as coefficient data in said production equation, executing:

a first step of performing a conversion processing on a teacher signal to obtain a student signal;

a second step of shifting a position of said student signal with a position of said teacher signal, the information data position of said teacher signal being gradually changed with respect to the information data position of said student signal;

a third step of selecting a plurality of information data located in periphery of a target position in said teacher signal, based on said student signal having a position shifted in said second step;

a fourth step of producing a normal equation for obtaining said coefficient seed data using the plurality of said information data selected in the third step and said information data at said target position in said teacher signal; and a fifth step of solving the normal equation produced in the fourth step to obtain said coefficient seed data.

5. A coefficient seed data production device for producing coefficient seed data, said coefficient seed data being used as coefficient data in a production equation for producing coefficient data to be used in an estimated equation employed for converting a first information signal including a first plurality of information data into a second information signal including a second plurality of information data, said production equation using positional information as a parameter, comprising:

signal processing means for performing a conversion processing on a teacher signal to obtain a student signal;

positional shift means for shifting a position of said student signal with a position of said teacher signal, the information data position of said teacher signal being gradually changed with respect to the information data position of said student signal;

first data selection means for selecting a plurality of first information data located in a periphery of a target position in said teacher signal, based on said student signal having a position shifted by said position shift means;

first normal equation production means for producing a first normal equation for obtaining the coefficient data of said estimated equation per position shift value of said student signal using the selected plurality of said first information data and the information data at the target position in said teacher signal;

coefficient data calculation means for solving said first normal equation to obtain the coefficient data of said estimated equation per said position shift value;

second normal equation production means for producing a second normal equation for obtaining said coefficient seed data using the coefficient data per said position shift value obtained in the coefficient data calculation means; and coefficient seed data calculation means for solving said second normal equation to obtain said coefficient seed data.

6. The coefficient seed data production device according to claim 5, further comprising:
   second data selection means for selecting a plurality of second information data located in a periphery of a target position in said teacher signal, based on said student signal having a position shifted by said positional shift means; and
   class detection means for detecting a class at said target position, based on the plurality of said second information data selected in said second data selection means,
   wherein said first normal equation production means produces a first normal equation for obtaining said coefficient data of said estimated equation of each combination between the class detected by said class detection means and the position shift value of said student signal using the class detected by said class detection means, said plurality of first information data selected in said first data selection means, and said information data at said target position in said teacher signal;
   wherein said coefficient data calculation means solves the first normal equation to obtain said coefficient data of said estimated equation of each combination;
   wherein said second normal equation production means produces a second normal equation for obtaining said coefficient seed data for each class, from the coefficient data of each combination obtained in said coefficient data calculation means; and
   wherein said coefficient seed data calculation means solves the second normal equation to obtain the coefficient seed data for each said class.

7. A method for producing coefficient seed data, said coefficient seed data being used as coefficient data in a production equation for producing coefficient data to be used in an estimated equation employed for converting a first information signal including a first plurality of information data into a second information signal including a second plurality of information data, said production equation using positional information as a parameter, comprising:
   a first step of performing a conversion processing on a teacher signal to obtain a student signal;
   a second step of shifting a position of said student signal with a position of said teacher signal, the information data position of said teacher signal being gradually changed with respect to the information data position of said student signal;
   a third step of selecting a plurality of information data located in periphery of a target position in said teacher signal, based on said student signal having a position shifted in the second step;
   a fourth step of producing a first normal equation for obtaining said coefficient data of said estimated equation per position shift value of said student signal using the selected plurality of said information data and the information data at said target position in said teacher signal;
   a fifth step of solving said first normal equation produced in the fourth step to obtain the coefficient data of said estimated equation per said position shift value;
   a sixth step of producing a second normal equation for obtaining said coefficient seed data using the coefficient data per said position shift value obtained in the fifth step; and
   a seventh step of solving said second normal equation produced in the sixth step to obtain said coefficient seed data.

8. An information-providing medium for providing a computer program for, in order to produce coefficient seed data for use in a production that is used to produce coefficient for use in an estimated equation employed for converting a first information signal including a first plurality of information data into a second information signal including a second plurality of information data, said production equation using position information as a parameter, and said coefficient seed data being used as coefficient data in said production equation, executing:
   a first step of performing a conversion processing on a teacher signal to obtain a student signal;
   a second step of shifting a position of said student signal with a position of said teacher signal, the information data position of said teacher signal being gradually changed with respect to the information data position of said student signal;
   a third step of selecting a plurality of information data located in a periphery of a target position in said teacher signal, based on said student signal having a position shifted in the second step;
   a fourth step of producing a first normal equation for obtaining said coefficient data of said estimated equation per position shift value of said student signal using the selected plurality of said information data and the information data at said target position in said teacher signal;
   a fifth step of solving said first normal equation produced in the fourth step to obtain the coefficient data of said estimated equation per said position shift value;
   a sixth step of producing a second normal equation for obtaining said coefficient seed data using the coefficient data per said position shift value obtained in the fifth step; and
   a seventh step of solving said second normal equation produced in the sixth step to obtain said coefficient seed data.

* * * * *